United States Patent
Sudoh

(10) Patent No.: US 7,535,653 B2
(45) Date of Patent: May 19, 2009

(54) ZOOM LENS, IMAGING DEVICE AND CAMERA DEVICE AND MOBILE INFORMATION TERMINAL USING THE ZOOM LENS

(75) Inventor: Yoshifumi Sudoh, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 94 days.

(21) Appl. No.: 11/723,287

(22) Filed: Mar. 19, 2007

(65) Prior Publication Data
US 2007/0247726 A1    Oct. 25, 2007

(30) Foreign Application Priority Data
Mar. 20, 2006    (JP) ............................ 2006-076892

(51) Int. Cl.
*G02B 15/14* (2006.01)
(52) U.S. Cl. ...................................... 359/689; 359/680
(58) Field of Classification Search ......... 359/680–682, 359/689
See application file for complete search history.

(56) References Cited

U.S. PATENT DOCUMENTS

| 6,917,476 | B2 * | 7/2005 | Eguchi ........................ 359/689 |
| 2006/0279851 | A1 * | 12/2006 | Yasui ........................ 359/680 |

FOREIGN PATENT DOCUMENTS

| JP | 2003-035868 | 2/2003 |
| JP | 2003-107352 | 4/2003 |
| JP | 2003-131134 | 5/2003 |
| JP | 2005-024988 | 1/2005 |
| JP | 2005-300745 | 10/2005 |
| JP | 2006-052862 | 2/2006 |
| JP | 2007-108531 | 4/2007 |
| JP | 2007-178846 | 7/2007 |
| JP | 2007-232918 | 9/2007 |

OTHER PUBLICATIONS

European Search Report for Corresponding Application.

* cited by examiner

*Primary Examiner*—Scott J Sugarman
*Assistant Examiner*—Dawayne A Pinkney
(74) *Attorney, Agent, or Firm*—Harness, Dickey & Pierce, P.L.C.

(57) ABSTRACT

A zoom lens, including: a first group optical system having a negative focal length; a second group optical system having a positive focal length; a third group optical system having a positive focal length, the first group optical system, the second group optical system and the third group optical system being arranged in this order from an object side to an image side; and an aperture stop configured to move together with the second group optical system and disposed on the object side of the second group optical system, a change in magnification being carried out by decreasing a space between the first group optical system and the second group optical system when the change in magnification is carried out from a short focal length end to a long focal length end.

16 Claims, 15 Drawing Sheets

ZOOM LENS, IMAGING DEVICE AND CAMERA DEVICE AND MOBILE INFORMATION TERMINAL USING THE ZOOM LENS

BACKGROUND OF THE INVENTION

1. Field of the Invention

The present invention relates to a zoom lens, and to an imaging device, a camera device and a mobile information terminal using the zoom lens as a photographing optical system.

2. Description of the Related Art

In recent years, a type of camera known as a digital camera or an electronic camera has become popular. In such a type of camera, an image of a subject is captured by a solid-state image sensor including an image pickup device or the like which includes for example a CCD (charge-coupled device), C-MOS image sensor or the like, image data of a still image or a moving image of the subject is obtained, and then the data is recorded digitally in a nonvolatile semiconductor memory represented by a flash memory. On the other hand, a conventional camera using a traditional silver salt film, i.e. a silver salt camera, is gradually becoming a thing of the past.

The market for such a digital camera is huge, and the demand of users for a digital camera varies over a wide range. In particular, a user always requires high image quality, wide field of view, and a reduction of size of the camera.

A variable focal length lens such as a zoom lens or the like is often used as a photographing lens in this type of digital camera, to utilize the features of compactness, lightness, and high performance. In most cases, a zoom lens including two groups or three groups of lenses which is not constituted of many lenses is used as the zoom lens for the digital camera.

In addition, high image quality compatible with a light-receiving element having more than three million pixels, as well as a wide field of view, large diameter and compactness are required in the zoom lens.

A conventional imaging device which is suitable for a digital camera or the like is disclosed in the following reference documents, by way of example: JP 2003-131134A, JP 2003-107352A, JP 2003-35868A, and JP 2005-24988A. Each of these conventional imaging devices is suitable for downsizing, has a wide field of view of 38 degrees or more in a half-field angle, and has an F-number of three or less in a short focal length end, Namely, the above-mentioned reference documents each discloses an imaging device using a zoom lens which has a wide field of view of 38 degrees or more in a half-field angle and has an F-number of three or less in a short focal length end, wherein the zoom lens used in the imaging device includes a first group optical system having a negative focal length; a second group optical system having a positive focal length; a third group optical system having a positive focal length, the first group optical system, the second group optical system and the third group optical system being arranged in this order from an object side to an image side; and an aperture stop configured to move together with the second group optical system and disposed on the object side of the second group optical system, a change in magnification being carried out by decreasing a space between the first group optical system and the second group optical system when the change in magnification is carried out from a short focal length end to a long focal length end.

In the above-mentioned reference documents, due to not using an optical material having a high refractive index to produce the negative lenses of the second group optical system, manufacturing error sensitivity of the negative lens can not be controlled.

In addition, there is also a drawback in JP2005-24988A in that miniaturization is not sufficiently attained.

SUMMARY OF THE INVENTION

Therefore, in light of the above, at least one object of the present invention is to provide a zoom lens which is compact enough and displays high performance, and has a wide field of view of 38 degrees or more in a half-field angle and an F-value of three or less in a short focal length end.

A zoom lens and an imaging device using the zoom lens according to the present invention includes, a first group optical system having a negative focal length; a second group optical system having a positive focal length and including at least two positive lenses and at least one negative lens in which one of the two positive lenses is disposed nearest to an object side in the second group optical system; a third group optical system having a positive focal length, the first group optical system, the second group optical system and the third group optical system being arranged in this order from the object side to an image side; and an aperture stop configured to move together with the second group optical system and disposed on the object side of the second group optical system, a change in magnification being carried out by decreasing a space between the first group optical system and the second group optical system when the change in magnification is carried out from a short focal length end to a long focal length end, wherein the following formulae are satisfied:

$$1.95 < Nn < 2.20$$

$$1.5 < vn < 35$$

in which Nn represents a refractive index of a lens with a highest refractive index in the at least one negative lens of the second group optical system, and vn represents an Abbe number of the lens with the highest refractive index in the at least one negative lens of the second group optical system.

It is preferable that the zoom lens further satisfy the following formula:

$$-0.02 < (r1-r2)/(r1+r2) < 0.07$$

in which r1 represents a curvature radius of a surface on the object side of the positive lens disposed nearest to the object side in the second group optical system, and r2 represents a curvature radius of a surface on the image side of the lens with the highest refractive index in the at least one negative lens of the second group optical system.

It is preferable that the zoom lens further satisfy the following formula:

$$0.8 < tn/Y' < 1.4$$

in which tn represents a distance on an optical axis from the surface on the object side of the positive lens disposed nearest to the object side in the second group optical system to the surface on the image side of the lens with the highest refractive index in the at least one negative lens of the second group optical system, and Y' represents a largest image height.

It is preferable that the second group optical system include a cemented lens of a positive lens and a negative lens.

It is preferable that at least one of the positive lenses of the second group optical system be an aspherical surface.

It is preferable that the surface on the object side of the positive lens disposed nearest to the object side in the second group optical system include an aspherical surface.

It is preferable that the zoom lens further satisfy the following formula:

$$0.8 < M/f2 < 1.5$$

in which M represents a displacement of the second group optical system, and f2 represents a focal length of the second group optical system.

It is preferable that the zoom lens further satisfy the following formula:

$$0.05 < Nn - Np < 0.3$$

in which Nn represents the refractive index of the lens with the highest refractive index in the at least one negative lens of the second group optical system, and Np represents a refractive index of the positive lens disposed nearest to the object side in the second group optical system.

It is preferable that the zoom lens further satisfy the following formula:

$$-15 < vn - vp < -5$$

in which vn represents the Abbe number of the lens with the highest refractive index in the at least one negative lens of the second group optical system, and vp represents an Abbe number of the positive lens disposed nearest to the object side in the second group optical system.

It is preferable that the zoom lens further satisfy the following formula:

$$0.8 < \psi / \{r1 * \tan(\omega)\} < 1.2$$

in which ψ represents a largest diameter of the aperture stop, ω represents a half-field angle in the short focal length end, and r1 represents the curvature radius of the surface on the object side of the positive lens disposed nearest to the object side in the second group optical system.

It is preferable that the third group optical system include a spherical lens.

An imaging device according to the present invention includes one of the zoom lenses mentioned above.

A camera device according to the present invention includes one of the zoom lenses mentioned above or an imaging device using one of the zoom lenses mentioned above.

It is preferable that the camera device have a function of converting a photographed image into digital data.

It is preferable that the camera device further include a light-receiving element configured to receive an image captured by the zoom lens, and have pixels equal to or more than three million.

A mobile information terminal according to the present invention includes one of the zoom lenses mentioned above, or an imaging device using one of the zoom lenses mentioned above.

BRIEF DESCRIPTION OF THE DRAWINGS

The invention will be described further below with reference to embodiments and the accompanying schematic drawings, in which:

FIGS. 17A and 17B are external views schematically illustrating a digital camera as an embodiment of a camera device (a mobile information terminal) according to the invention, in which FIG. 17A is a perspective view of the front side of the camera when being carried, and 17B is a perspective view of the back side of the camera.

DETAILED DESCRIPTION OF THE PREFERRED EMBODIMENTS

Figure 1:
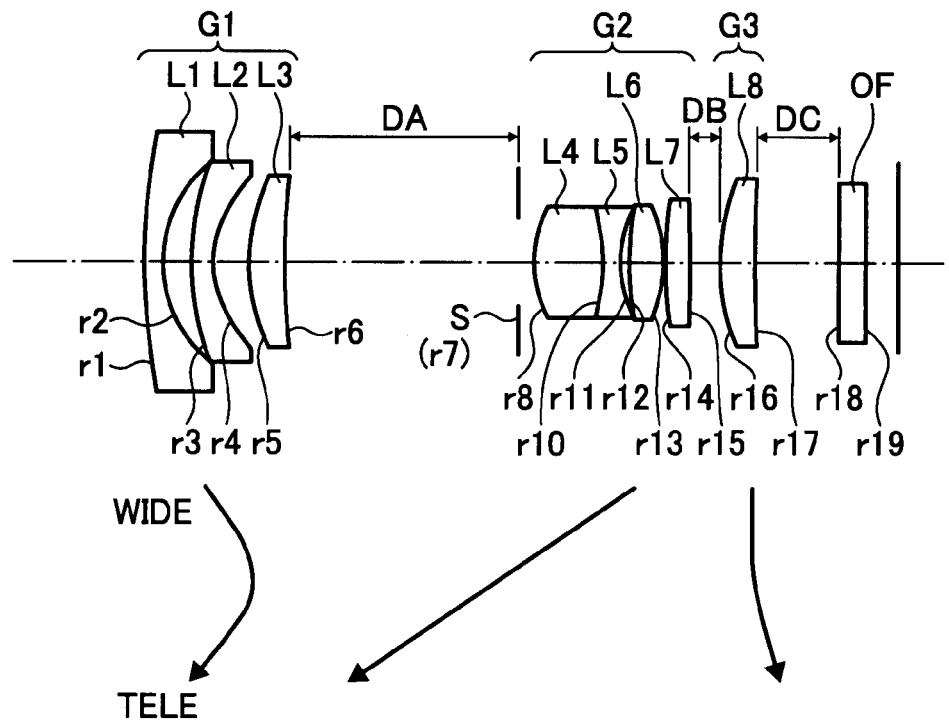
FIG. 1 is a sectional view illustrating a structure of a zoom lens according to a first embodiment of the invention.

As illustrated in FIGS. 1 to 4, each of zoom lenses according to first to the fourth embodiments of the present invention is a zoom lens including, a first group optical system G1 having a negative focal length; a second group optical system G2 having a positive focal length; a third group optical system G3 having a positive focal length, the first group optical system G1, the second group optical system G2 and the third group optical system G3 being arranged in this order from an object side to an image side; and an aperture stop S configured to move together with the second group optical system G2 and disposed on the object side of the second group optical system G2, a change in magnification being carried out by decreasing a space between the first group optical system G1 and the second group optical system G2 when the change in magnification is carried out from a short focal length end to a long focal length end.

Each of the zoom lenses illustrated in FIGS. 1 to 4 includes a first lens L1, a second lens L2, a third lens L3, a fourth lens L4, a fifth lens L5, a sixth lens L6, a seventh lens L7, an eighth lens L8, an aperture stop S and an optical filter OF.

In the present embodiment, the first lens L1 to the third lens L3 constitute a first group optical system G1, the fourth lens L4 to the seventh lens L7 constitute a second group optical system G2, the eighth lens L8 constitutes a third group optical system G3, and the lenses are supported per group, where appropriate, by a common support frame or the like, and operate integrally per group when zooming and so on is carried out. In addition, surface numbers r1 to r19 of each optical surface are also illustrated in FIGS. 1 to 4.

A zoom lens according to an embodiment of the present invention which includes such a lens structure and an imaging device using the zoom lens, have the following features.

First, to attain compactness, it is desirable to shorten a length of collapse and a total length of lenses. Herein, the term "length of collapse" indicates by way of example a sum of the thickness of the first group optical system to the third group optical system, and the term "total length of lenses" indicates by way of example a distance from a lens nearest to the object side to an image surface. In addition, for a zoom lens used in a so-called retractable type camera device, it is important to reduce the lens diameter so as to prevent the size of the lens barrel including a plurality of stages from becoming too large.

In the zoom lens constituted of three groups of optical systems, for example the negative-positive-positive groups of the optical systems according to the embodiment of the present invention, most of the functions required to change the magnification are performed by the second group optical system, and the third group optical system is provided mainly for keeping an exit pupil at a distance from the image surface.

For shortening the length of collapse, it may be necessary to reduce the thickness of the lens or the space, and for shortening the total length of lenses, it may be necessary for an optical system which performs the change in magnification to have a high function of change in magnification.

Therefore, according to the present embodiment of the present invention, the zoom lens is made to satisfy the following formulae:

$$1.95 < Nn < 2.20 \quad (1)$$

$$15 < vn < 35 \quad (2)$$

in which Nn represents a refractive index of a lens with a highest refractive index in the at least one negative lens of the second group optical system, and vn is an Abbe number of the lens with the highest refractive index in the at least one negative lens of the second group optical system.

By using an optical material having a high refractive index to produce the negative lenses of the second group optical system, monochromatic aberration correction can be performed sufficiently. In addition, manufacturing error sensitivity of the negative lens is able to be controlled.

If the lower limit of the expression (1) is not satisfied, it is difficult to correct monochromatic aberration sufficiently and to suppress an increase in the manufacturing error sensitivity while the negative lens is shortened sufficiently. In addition, if the upper limit is exceeded, the cost of the optical material becomes high.

If the lower limit of the expression (2) is not satisfied, it is difficult to correct monochromatic aberration sufficiently and to correct chromatic aberration of magnification while the negative lens is shortened sufficiently. In addition, if the upper limit is exceeded, it is difficult to correct monochromatic aberration sufficiently and to correct axial chromatic aberration while the negative lens is shortened sufficiently. To improve the effect mentioned above, it is preferable that the following expression be satisfied, $$20 < vn < 30 \quad (2')$$

Furthermore, to obtain even higher imaging performance, it is preferable to satisfy the following expression:

$$0.02 < (r1-r2)/(r1+r2) < 0.07 \quad (3)$$

in which r1 represents a curvature radius of a surface on the object side of a positive lens disposed nearest to the object side in the second group optical system, and r2 represents a curvature radius of a surface on the image side of the lens with the highest refractive index in the at least one negative lens of the second group optical system.

If the lower limit of the expression (3) is not satisfied, aberration generated by the surface on the object side r8 of the positive lens L4 disposed nearest to the object side in the second group optical system G2 becomes larger than aberration generated by a surface on the image side of a lens with the highest refractive index in the at least one negative lens of the second group optical system G2 (in the present embodiment, the fifth lens L5). If the upper limit of the expression (3) is exceeded, aberration generated by a surface on the image side of a lens with the highest refractive index in the at least one negative lens of the second group optical system G2 (in the present embodiment, the fifth lens L5) becomes larger than aberration generated by the surface on the object side r8 of the positive lens (the fourth lens L4) disposed nearest to the object side in the second group optical system G2. In both of these cases, it is difficult to achieve aberration balance.

Further, to obtain even higher imaging performance while the length of collapse is shortened, it is preferable to satisfy the following expression:

$$0.8 < tn/Y' < 1.4 \quad (4)$$

in which tn represents a distance on an optical axis from the surface on the object side of the positive lens disposed nearest to the object side in the second group optical system to the surface on the image side of the lens with the highest refractive index in the at least one negative lens of the second group optical system, and Y' represents a largest image height.

Both the surface on the object side r8 of the positive lens (the fourth lens L4) disposed nearest to the object side in the second group optical system and the surface on the image side r11 of the lens with the highest refractive index in the at least one negative lens of the second group optical system (the fifth lens L5) have a small curvature, and both of the surfaces adjust the aberrations with each other greatly and make the greatest contribution to the aberration correction. To perform the aberration correction sufficiently, a height of a light ray passing through the two surfaces is important.

If the lower limit of the expression (4) is not satisfied, a height of an off-axis main light ray in the surface on the image side r11 of the lens with the highest refractive index in the at least one negative lens of the second group optical system (the fifth lens L5) becomes too small, and hence, astigmatism and coma aberration corrections become difficult.

If the upper limit of the expression (4) is exceeded, a height of an axial marginal light ray in the surface on the image side r11 of the lens with the highest refractive index in the at least one negative lens of the second group optical system G2 (the fifth lens L5) becomes too small, and hence, spherical aberration correction becomes difficult. In addition, it may be disadvantageous to reduce the size of the second group optical system.

Further, it is preferable that the following expression (4') be satisfied, $$0.9 < tn/Y' < 1.3 \tag{4'}$$

In addition, in the zoom lens according to the embodiment of the present invention, the second group optical system includes a cemented lens of a positive lens and a negative lens.

This is because, when the surface on the object side of the positive lens and the surface on the image side of the negative lens adjust aberrations with each other greatly, the influence of the connecting error of the two lenses (for example, decentering etc.) on imaging performance tends to be greater. Given this factor, connecting error itself is suppressed to be low by cementing the two lenses.

In addition, it is preferable that at least one of the positive lenses of the second group optical system be an aspherical surface.

The axial marginal light ray in the second group optical system becomes high. Therefore, using an aspherical lens in the second group optical system is effective in terms of spherical aberration and coma aberration corrections. In particular, the axial marginal ray becomes highest in the surface on the object side of the positive lens nearest to the object side. Therefore the effect of the aspherical surface for spherical aberration and coma aberration corrections is greatest.

Further, to obtain even higher imaging performance while the total length of lenses is shortened, it is preferable to satisfy the following expression:

$$0.8 < M/f2 < 1.5 \tag{5}$$

in which M represents a displacement of the second group optical system, and f2 represents a focal length of the second group optical system.

If the lower limit of the expression (5) is not satisfied, it is difficult to ensure a necessary zoom ratio by the second group optical system. Further, if the upper limit of the expression (5) is exceeded, it is difficult to correct aberrations while the total length of lenses is shortened.

Moreover, it is further preferable that the following expression be satisfied, $$0.9 < M/f2 < 1.4 \tag{5'}$$

In addition, to obtain even higher imaging performance, it is preferable to satisfy the following expression:

$$0.05 < Nn - Np < 0.3 \tag{6}$$

in which Nn represents the refractive index of the lens with the highest refractive index in the at least one negative lens of the second group optical system, and Np represents a refractive index of the positive lens disposed nearest to the object side in the second group optical system.

If the lower limit of the expression (6) is not satisfied, aberration generated by the surface on the image side of the lens with the highest refractive index in the at least one negative lens of the second group optical system becomes larger than aberration generated by the surface on the object side of the positive lens disposed nearest to the object side in the second group optical system. If the upper limit of the expression (6) is exceeded, aberration generated by the surface on the object side of the positive lens disposed nearest to the object side in the second group optical system becomes larger than aberration generated by the surface on the image side of the lens with the highest refractive index in the at least one negative lens of the second group optical system. In both of these cases, it is difficult to achieve aberration balance.

To obtain a further higher imaging performance, it is preferable to satisfy the following expression:

$$-15 < vn - vp < -5 \tag{7}$$

in which vn represents the Abbe number of the lens with the highest refractive index in the at least one negative lens of the second group optical system, and vp represents an Abbe number of the positive lens disposed nearest to the object side in the second group optical system.

If the lower limit of the expression (7) is not satisfied, it is difficult to correct axial chromatic aberration generated by the positive lens disposed nearest to the object side in the second group optical system. If the upper limit of the expression (7) is exceeded, it is difficult to correct chromatic aberration of magnification generated by the lens with the highest refractive index in the at least one negative lens of the second group optical system.

In addition, to obtain a wide field of view, a low F-number and high imaging performance, it is preferable to satisfy the following expression:

$$0.8 < \psi/\{r1 * \tan(\omega)\} < 1.2 \tag{8}$$

in which $\psi$ represents a largest diameter of the aperture stop, $\omega$ represents a half-field angle in the short focal length end, and r1 represents the curvature radius of the surface on the object side of the positive lens disposed nearest to the object side in the second group optical system.

If the lower limit of the expression (8) is not satisfied, the curvature radius of the positive lens disposed nearest to the object side in the second group optical system becomes higher so as to reduce the wide field of view and F-number. Thus it is difficult to correct aberration of the negative lens of the second group optical system while the length of collapse is shortened. If the upper limit of the expression (8) is exceeded, off-axis up and down light rays refract differently and greatly in the surface on the object side of the positive lens disposed nearest to the second group optical system. Thus it is difficult to correct coma aberration.

In addition, it is preferable that the following expression be satisfied, $$0.9 < \psi/\{r1 * \tan(\omega)\} < 1.1 \tag{8'}$$

In addition, it is preferable that the third group optical system include a spherical lens. Forming the aspherical surface in the third group optical system is effective for correction of an image surface, however a new problem arises in that when the lens is moved along an optical axis for focusing, degradation of image quality occurs due to the focusing.

Next, numerical embodiments of the present invention will be explained in detail.

FIGS. 1 to 4 are sectional views illustrating structures of lenses or imaging devices, and movement trajectory of the lenses when change in magnification is carried out, according to the first to the fourth embodiments of the present invention.

Aberrations in the embodiments are corrected sufficiently, as explained later. It is obvious from the following explanation of the embodiments that, by structuring a zoom lens according to embodiments of the present invention or an imaging device using the zoom lens according to the embodiments, it is possible to obtain a compact zoom lens having a wide field of view of 38 degrees or more in a half-field angle and an F-value of three or less in a short focal length end, and ensure an extremely good image performance.

Meanings of signs in the embodiments are as follows:
f: focal length of entire system
F: F-number (F-value)
ω: half-field angle
r: curvature radius
D: surface distance
DA, DD, DC: variable distance
$N_d$: refractive index
$v_d$: Abbe number
K: cone constant of aspheric surface
$A_4$: $4^{th}$ aspheric surface coefficient
$A_6$: $6^{th}$ aspheric surface coefficient
$A_8$: $8^{th}$ aspheric surface coefficient
$A_{10}$: $10^{th}$ aspheric surface coefficient
$A_{12}$: $12^{th}$ aspheric surface coefficient
$A_{14}$: $14^{th}$ aspheric surface coefficient
$A_{16}$: $16^{th}$ aspheric surface coefficient
$A_{18}$: $18^{th}$ aspheric surface coefficient However, the aspheric surfaces used here may be expressed by the following equation (9):

$$X = CH^2/\{1+\sqrt{(1-(1+K)C^2H^2)}\} + A_4 \cdot H^4 + A_6 \cdot H^6 + A_8 \cdot H^8 + A_{10} \cdot H^{10} + A_{12} \cdot H^{12} + A_{14} \cdot H^{14} + A_{16} \cdot H^{16} + A_{18} \cdot H^{18}$$

wherein "C" represents an inverse number of a paraxial curvature radius (paraxial curvature), and "H" represents a height from an optical axis.

In addition, E-XY in the numerical embodiments described as follows means $10^{-xy}$. Further, in the aberration diagrams explained hereinafter, the solid lines in the spherical aberration diagrams illustrate spherical aberration, the dashed lines in the spherical aberration diagrams illustrate sine condition, the solid lines in the astigmatic diagrams illustrate sagittal, and the dashed lines in the astigmatic diagrams illustrate meridional. Moreover, one of the solid lines indicates d line (587.56 nm), and the other one of the solid lines indicates g line (435.83 nm).

EMBODIMENT 1

FIG. 1 illustrates a structure of optical systems of a zoom lens in a short focal length end (i.e. in a wide angle end) according to the first embodiment of the present invention.

The zoom lens illustrated in FIG. 1 includes a first lens L1, a second lens L2, a third lens L3, an aperture stop S, a fourth lens L4, a fifth lens L5, a sixth lens L6, a seventh lens L7, an eighth lens L8 and an optical filter OF, which are arranged in this order from an object side to an image side, and an image is formed behind the optical filter OF, which has various optical filtering functions. In the present embodiment, the first lens L1 to the third lens L3 constitute a first group optical system G1, the fourth lens L4 to the seventh lens L7 constitute a second group optical system G2, the eighth lens L8 constitutes a third group optical system G3, and the lenses are supported per group of the optical system by a common support frame or the like as necessary, and operate integrally per group of the optical system when zooming and so on is carried out. In addition, FIG. 1 also illustrates the surface number of each optical surface.

The first lens L1 is a negative meniscus lens formed to be in a convex shape on the object side, the second lens L2 is a negative meniscus lens formed to be in a convex shape on the object side, and the third lens L3 is a positive meniscus lens having a convex surface toward the object side. The first group optical system G1 including the first lens L1 to the third lens L3 has a negative focal length, i.e. a negative refractive power as a whole.

The fourth lens L4 is a positive lens having a biconvex lens including a strong convex surface toward the object side, and is also an aspherical lens which has an aspherical surface on a surface on the object side of the lens. The fifth lens L5 is a negative lens having a biconcave lens including a strong concave surface toward the image side. The fourth lens L4 and the fifth lens L5 are in close contact with each other in series and are joined together to form a cemented lens (including two lenses). The sixth lens L6 is a positive lens having a biconvex lens, and the seventh lens L7 is a positive meniscus lens formed to be in a convex shape on the object side. The second group optical system G2, structured by four lenses in three groups, including the fourth lens L4 to the seventh lens L7, has a positive focal length, i.e. a positive refractive power as a whole. The aperture stop S disposed on the object side of the second group optical system G2 operates integrally with the second group optical system G2. The eighth lens L8 is a positive meniscus lens formed to be in a convex shape on the object side, and the third group optical system G3 including only the eighth lens L8 has a positive focal length, i.e. a positive refractive power.

When changing the focal length from a wide angle end (short focal length end) to a telephoto end (long focal length end), the first group optical system G1 moves to the object side with a concave trajectory, and the second group optical system G2 moves to the object side monotonously. Focusing from infinity to a short-range object is performed by moving the third group optical system G3 to the object side on an optical axis. The optical filter OF disposed nearest to the image side structured by a parallel flat plate includes filter types such as a crystal low-pass filter, infrared cut filter and so on.

Variable distances between each group vary with the movement of each group in accordance with the focal length variation. More specially, a distance DA between a surface nearest to the image side in the first group optical system G1 (i.e. a surface r6 which is on the image side of the third lens L3) and a surface (i.e. r7) on the object side of the aperture stop S, which is integrated with the second group optical system G2, a distance DB between a surface nearest to the image side in the second group optical system G2 (i.e. a surface r15 which is on the image side of the seventh lens L7) and a surface nearest to the object side in the third group optical system G3 (i.e. a surface r16 which is on the object side of the eighth lens L8), and a distance DC between a surface nearest to the image side in the third group optical system G3 (i.e. a surface r17 which is on the image side of the eighth lens L8) and a surface on the object side of the optical filter OF (i.e. r18) are varied.

In the first embodiment, in accordance with the focal length variation from the wide angle end to the telephoto end, the focal length of the entire system f, F-number and the half-field angle ω vary as follows:

f: 4.32 to 12.26 mm
F-number (F-value): 2.69 to 4.70
ω: 40°37' to 16°12'

The properties of each optical surface are represented in the following table.

TABLE 1 f = 4.32~12.26, F = 2.69~4.70, ω = 40.37~16.12

| Surface No. | R | D | $N_d$ | $\nu_d$ | |
|---|---|---|---|---|---|
| 1 | 34.273 | 0.85 | 1.48749 | 70.24 | First Lens |
| 2 | 6.012 | 1.39 | | | |
| 3 | 12.608 | 1.00 | 1.88300 | 40.76 | Second Lens |
| 4* | 4.526 | 1.76 | | | |
| 5 | 8.825 | 1.76 | 1.80518 | 25.42 | Third Lens |
| 6 | 37.646 | Variable (DA) | | | |
| 7 | Aperture Stop (S) | 0.8 | | | |
| 8* | 5.336 | 3.39 | 1.80440 | 39.59 | Fourth Lens |
| 10 | −10.297 | 0.85 | 2.00330 | 28.27 | Fifth Lens |
| 11 | 5.387 | 0.40 | | | |
| 12 | 15.004 | 1.64 | 1.48749 | 70.24 | Sixth Lens |
| 13 | −7.038 | 0.10 | | | |
| 14 | 20.032 | 1.20 | 1.48749 | 70.24 | Seventh Lens |
| 15 | 254.894 | Variable (DB) | | | |
| 16 | 10.620 | 1.66 | 1.48749 | 70.24 | Eighth Lens |
| 17 | 72.585 | Variable (DC) | | | |
| 18 | ∞ | 1.34 | 1.50000 | 64.0 | Various Filters |
| 19 | ∞ | | | | |

In Table 1, each optical surface of the fourth surface r4 and the eighth surface r8 shown with an asterisk "*" is an aspheric surface. Parameters in the equation (9) of each aspheric surface are represented in the following table.

TABLE 2

| | | Aspherical coefficient | |
|---|---|---|---|
| | | r4 | r8 |
| Aspherical coefficient | K | 0.0 | 0.0 |
| | $A_4$ | −1.13948E−03 | −4.12578E−04 |
| | $A_6$ | −5.07594E−05 | 2.49752E−06 |
| | $A_8$ | 3.00057E−06 | −7.01389E−07 |
| | $A_{10}$ | −5.20888E−07 | −4.27783E−07 |
| | $A_{12}$ | 2.22213E−08 | 3.39652E−08 |
| | $A_{14}$ | −2.75304E−10 | 1.11743E−08 |
| | $A_{16}$ | −5.88700E−12 | −7.71382E−10 |
| | $A_{18}$ | −5.83772E−13 | −7.65504E−11 |

The variable distance DA between the first group optical system G1 and the aperture stop S, the variable distance DB between the second group optical system G2 and the third group optical system G3, and the variable distance DC between the third group optical system G3 and the optical filter OF are varied in accordance with zooming, as represented in the following table (Table 3).

TABLE 3

| | Distance Variation | | |
|---|---|---|---|
| | Wide angle end f = 4.32 | Intermediate focal length f = 7.28 | Telephoto end f = 12.26 |
| DA | 11.367 | 4.743 | 1.200 |
| DB | 1.450 | 6.562 | 15.714 |
| DC | 4.012 | 3.687 | 2.000 |

Values of parameters in the first embodiment which relate to the expressions (1) to (8) mentioned above are as follows:

$$Nn=2.00330 \quad (1)$$

$$\nu n=28.27 \quad (2)$$

$$(r1-r2)/(r1+r2)=-0.004756 \quad (3)$$

$$tn/Y'=1.21 \quad (4)$$

$$i\,M/f2=1.148 \quad (5)$$

$$Nn-Np=0.1989 \quad (6)$$

$$\nu n-\nu p=-11.32 \quad (7)$$

$$\psi/\{r1*\tan(\omega)\}=0.948 \quad (8)$$

Therefore, the values of parameters of the first embodiment for the expressions (1) to (8) mentioned above are within the ranges of the expressions.

Figure 5:
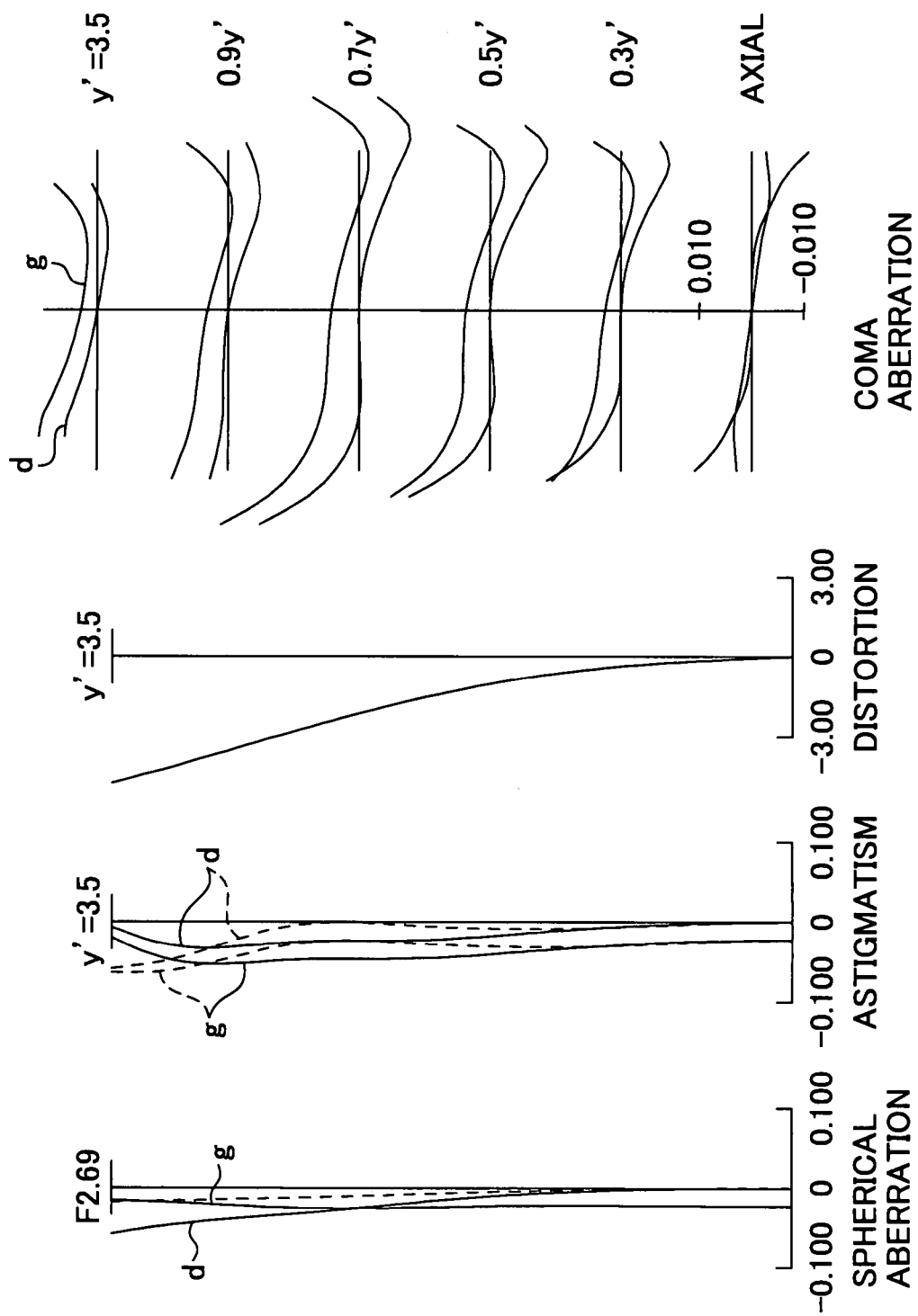
FIG. 5 is a view illustrating aberration diagrams in a short focal length end of the zoom lens according to the first embodiment.
Figure 6:
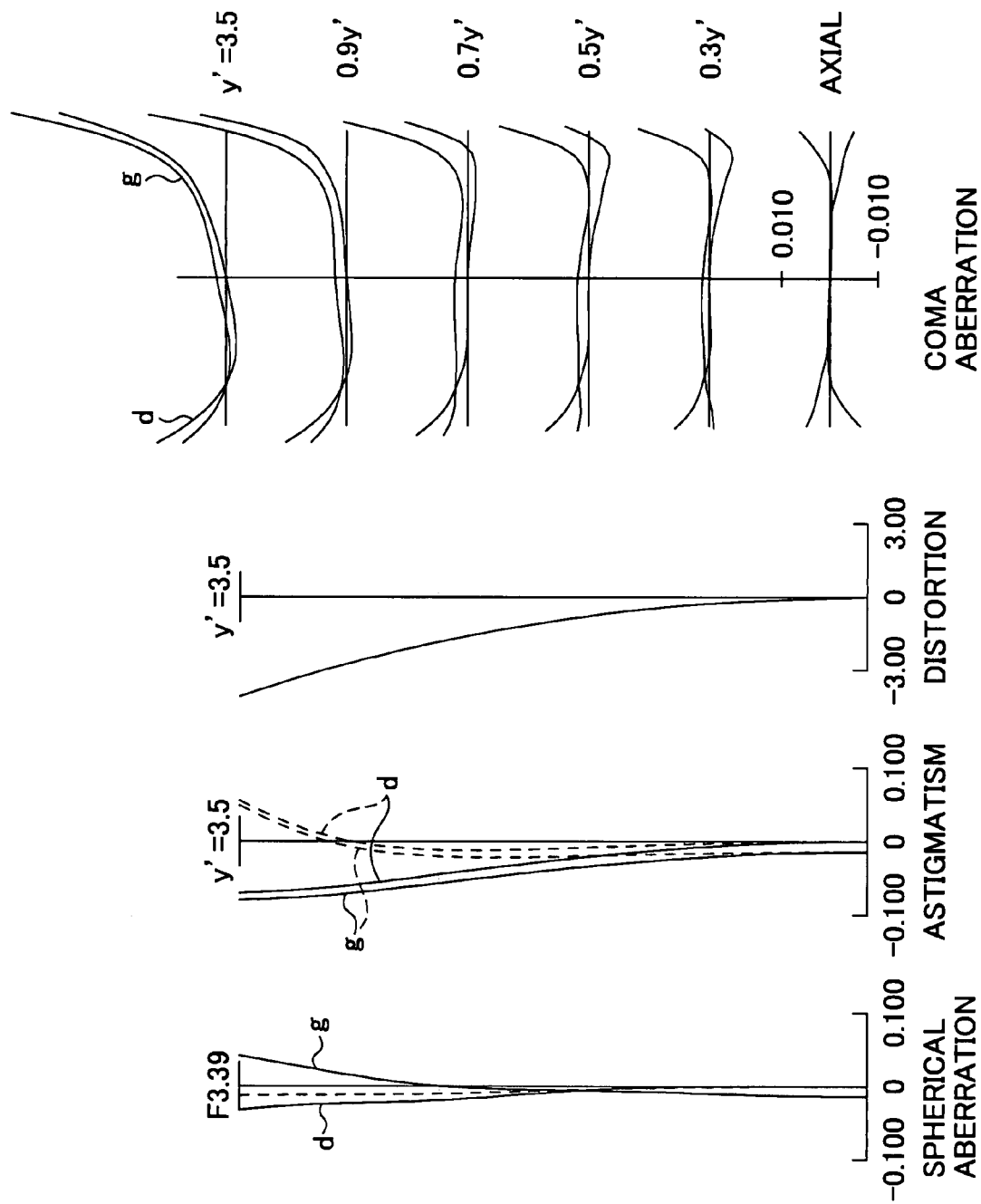
FIG. 6 is a view illustrating aberration diagrams in an intermediate focal length of the zoom lens according to the first embodiment.
Figure 7:
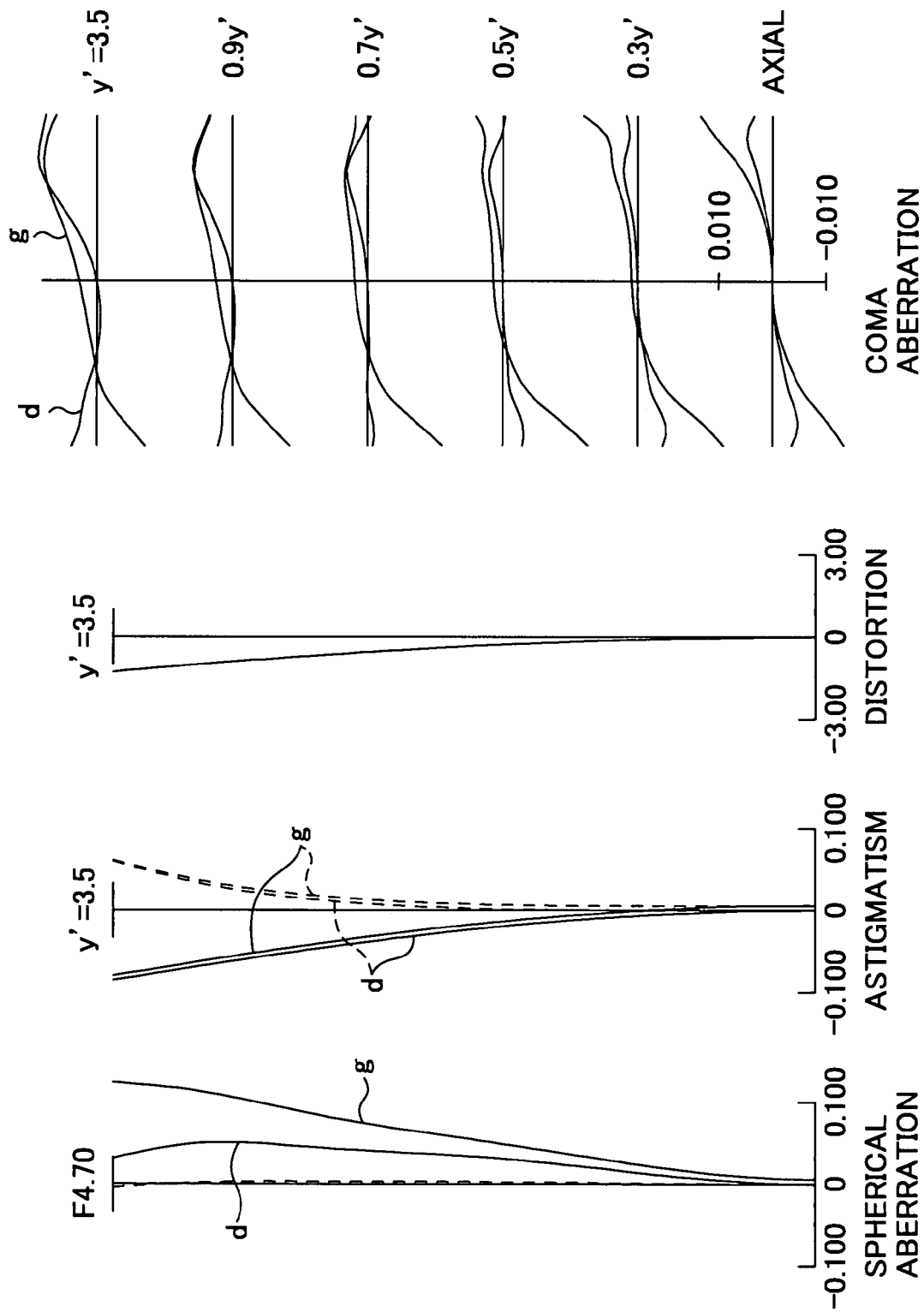
FIG. 7 is a view illustrating aberration diagrams in a long focal length end of the zoom lens according to the first embodiment.

FIGS. 5 to 7 illustrate aberration diagrams of each aberration in the zoom lens illustrated in FIG. 1 according to the first embodiment mentioned above. FIG. 5 illustrates aberration diagrams in the wide angle end, FIG. 6 illustrates aberration diagrams in the intermediate focal length, and FIG. 7 illustrates aberration diagrams in the telephoto end. In each aberration diagram, the dashed lines in the spherical aberration diagram illustrate sine condition, the solid lines in the astigmatic diagram illustrate sagittal, and the dashed lines in the astigmatic diagram illustrate meridional.

According to the aberration diagrams illustrated in FIGS. 5 to 7, it is understood that the aberrations are corrected or suppressed greatly by the zoom lens having a structure illustrated in FIG. 1 according to the first embodiment of the present invention mentioned above.

In the same way, excellent corrections of various aberrations are able to be achieved in the zoom lens which includes three groups having negative-positive-positive focal length, and thus it is possible to provide a compact enough, high performance zoom lens which has a wide field of view of 38 degrees or more in a half-field angle and an F-value of three or less in a short focal length end. In addition, it is possible to provide an imaging device using the zoom lens according to the present embodiment of the present invention.

In particular, by producing the negative lens of the second group optical system with a high refractive index optical material, it is possible to perform the monochromatic aberration correction sufficiently, the image surface correction by the second group optical-system becomes possible, and the manufacturing error of the negative lens can be controlled.

EMBODIMENT 2

Figure 2:
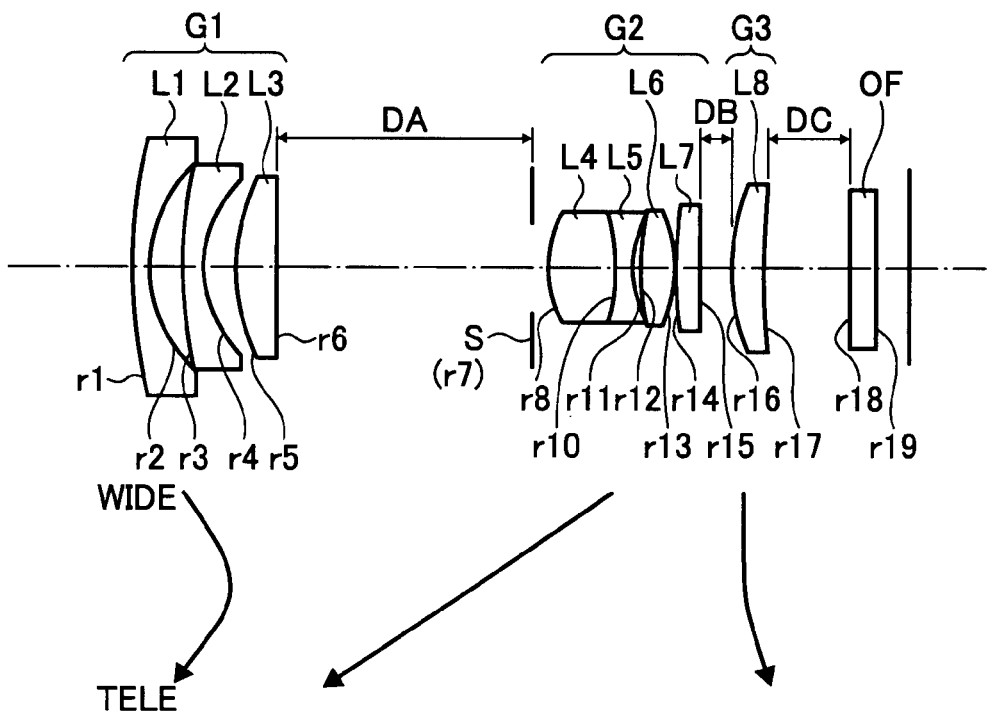
FIG. 2 is a sectional view illustrating a structure of a zoom lens according to a second embodiment of the invention.

FIG. 2 illustrates a structure of optical systems of a zoom lens in a short focal length end (i.e. in a wide angle end), according to the second embodiment of the present invention.

The zoom lens illustrated in FIG. 2 includes a first lens L1, a second lens L2, a third lens L3, a fourth lens L4, a fifth lens L5, a sixth lens L6, a seventh lens L7, an eighth lens L8, an aperture stop S, and an optical filter OF. In the present embodiment, the first lens L1 to the third lens L3 constitute a first group optical system G1, the fourth lens L4 to the seventh lens L7 constitute a second group optical system G2, the eighth lens L8 constitutes a third group optical system G3, and the lenses are supported per group by a common support frame or the like as necessary, and operate integrally per group when zooming and so on is carried out.

In addition, FIG. 2 also illustrates the surface number r1-r19 of each optical surface. Here, to avoid making the explanation complicated by increment of the digit number of reference numerals, each reference for FIG. 2 is used independently in each of the embodiments, therefore, even if a common reference numeral in FIG. 1 is used in FIG. 2, it is not necessary that the corresponding structure be the same as the structure in the first embodiment.

In FIG. 2, for example, the first lens L1, the second lens L2, the third lens L3, the aperture stop S, the fourth lens L4, the fifth lens L5, the sixth lens L6, the seventh lens L7, the eighth lens L8, and the optical filter OF are arranged in this order from an object side such as a subject or the like to an image side, and an image is formed behind the optical filter OF, which has various optical filtering functions.

The first lens L1 is a negative meniscus lens formed to be in a convex shape on the object side, the second lens L2 is a negative meniscus lens formed to be in a convex shape on the object side, and the third lens L3 is a positive lens having a plane-convex lens including a convex surface toward the object side. The first group optical system G1 including the first lens L1 to the third lens L3 has a negative focal length, i.e. a negative refractive power as a whole.

The fourth lens L4 is a positive lens having a biconvex lens including a strong convex surface toward the object side, and an aspherical surface is formed on its surface on the object side of the lens. However, in the present embodiment, for example, it is possible for the fourth lens L4 to be a hybrid aspheric lens which includes an aspheric surface on its object side surface, the hybrid aspheric lens being made of glass and the aspherical surface being formed by shaping a resin material on the surface on the object side. The fifth lens L5 is a negative lens having a biconcave lens including a strong concave surface toward the image side. The fourth lens L4 and the fifth lens L5 are in close contact with each other in series and are joined together to form a cemented lens (including two lenses).

The sixth lens L6 is a positive lens having a biconvex lens, and the seventh lens L7 is a positive lens having a biconvex lens including a strong convex surface toward the object side. The second group optical system G2, structured by four lenses in three groups, including the fourth lens L4 to the seventh lens L7, has a positive refractive power as a whole. The aperture stop S disposed on the object side of the second group optical system G2 operates integrally with the second group optical system G2. The eighth lens LB is a positive meniscus lens formed to be in a convex shape on the object side, and the third group optical system G3 including only the eighth lens L8 has a positive refractive power.

When changing the focal length from a wide angle end to a telephoto end, the first group optical system G1 moves to the object side with a concave trajectory, and the second group optical system G2 moves to the object side monotonously. Focusing from infinity to a short-range object is performed by moving the third group optical system G3 to the object side on an optical axis. The optical filter OF disposed nearest to the image side structured by a parallel flat plate includes filter types such as a crystal low-pass filter, infrared cut filter and so on.

Variable distances between each group vary with the movement of each group of optical system in accordance with the focal length variation. More specially, a distance DA between a surface nearest to the image side in the first group optical system G1 (i.e. a surface r6 which is on the image side of the third lens L3) and a surface (i.e. r7) on the object side of the aperture stop S, which is integrated with the second group optical system G2, a distance DB between a surface nearest to the image side in the second group optical system G2 (i.e. a surface r15 which is on the image side of the seventh lens L7) and a surface nearest to the object side in the third group optical system G3 (i.e. a surface r16 which is on the object side of the eighth lens L8), and a distance DC between a surface nearest to the image side in the third group optical system G3 (i.e. a surface r17 which is on the image side of the eighth lens L8) and a surface on the object side of the optical filter OF (i.e. r18) are varied.

In the second embodiment, in accordance with the focal length variation, from the wide angle end to the telephoto end, the focal length of the entire system f, F-number and the half-field angle ω vary as follows:

f: 4.32 to 12.26 mm

F: 2.70 to 4.66

ω: 40°42' to 16°16'

The properties of each optical surface are represented in the following table (Table 4).

TABLE 4 f = 4.32~12.26, F = 2.70~4.66, ω = 40.42~16.16

| Surface No. | R | D | $N_d$ | $v_d$ | |
|---|---|---|---|---|---|
| 1 | 25.834 | 0.85 | 1.57135 | 52.95 | First Lens |
| 2 | 6.663 | 1.57 | | | |
| 3 | 21.045 | 1.00 | 1.88300 | 40.76 | Second Lens |
| 4* | 4.957 | 1.57 | | | |
| 5 | 9.672 | 1.96 | 1.78472 | 25.68 | Third Lens |
| 6 | ∞ | Variable (DA) | | | |
| 7 | Aperture Stop (S) | 0.8 | | | |
| 8* | 5.185 | 3.29 | 1.80100 | 34.97 | Fourth Lens |
| 10 | −11.007 | 0.85 | 2.00069 | 25.46 | Fifth Lens |
| 11 | 5.096 | 0.41 | | | |
| 12 | 13.206 | 1.63 | 1.48749 | 70.24 | Sixth Lens |
| 13 | −7.338 | 0.10 | | | |
| 14 | 23.804 | 1.16 | 1.51823 | 58.90 | Seventh Lens |
| 15 | −315.848 | Variable (DB) | | | |
| 16 | 10.347 | 1.61 | 1.48749 | 70.24 | Eighth Lens |
| 17 | 49.382 | Variable (DC) | | | |
| 18 | ∞ | 1.34 | 1.50000 | 64.0 | Various Filters |
| 19 | ∞ | | | | |

In Table 4, each optical surface of the fourth surface r4 and the eighth surface r8 shown with an asterisk "*" is an aspheric surface. Parameters in the equation (9) of each aspheric surface mentioned above are represented in the following table.

TABLE 5

Aspherical coefficient

| | | r4 | r8 |
|---|---|---|---|
| Aspherical coefficient | K | 0.0 | 0.0 |
| | $A_4$ | −9.88470E−04 | −4.08534E−04 |
| | $A_6$ | −3.74737E−05 | 2.62889E−06 |
| | $A_8$ | 3.18235E−06 | −8.61853E−07 |
| | $A_{10}$ | −4.48571E−07 | −4.08562E−07 |
| | $A_{12}$ | 2.22931E−08 | 3.48877E−08 |
| | $A_{14}$ | −3.91879E−10 | 1.07332E−08 |
| | $A_{16}$ | −8.18480E−12 | −1.08733E−09 |
| | $A_{18}$ | 1.67022E−13 | −2.40496E−11 |

The distance DA between the first group optical system G1 and the aperture stop S which is integrated with the second group optical system G2, the distance DB between the second group optical system G2 and the third group optical system G3, and the distance DC between the third group optical system G3 and the optical filter OF are varied when the focal length varying, as represented in the following table.

TABLE 6

| | Distance Variation | | |
|---|---|---|---|
| | Wide angle end f = 4.32 | Intermediate focal length f = 7.28 | Telephoto end f = 12.26 |
| DA | 12.498 | 5.211 | 1.200 |
| DB | 1.450 | 6.498 | 15.267 |
| DC | 4.055 | 3.621 | 2.011 |

Values of parameters in the second embodiment which relate to the expressions (1) to (8) mentioned above are as follows:

$$Nn = 2.00069 \quad (1)$$

$$\nu n = 25.46 \quad (2)$$

$$(r1-r2)/(r1+r2) = 0.008657 \quad (3)$$

$$tn/Y = 1.18 \quad (4)$$

$$M/f2 = 1.073 \quad (5)$$

$$Nn - Np = 0.19969 \quad (6)$$

$$\nu n - \nu p = -9.51 \quad (7)$$

$$\psi/\{r1*\tan(\psi)\} = 0.996 \quad (8)$$

Therefore, the values of parameters of the second embodiment for the expressions (1) to (8) mentioned above are within the ranges of the expressions.

Figure 8:
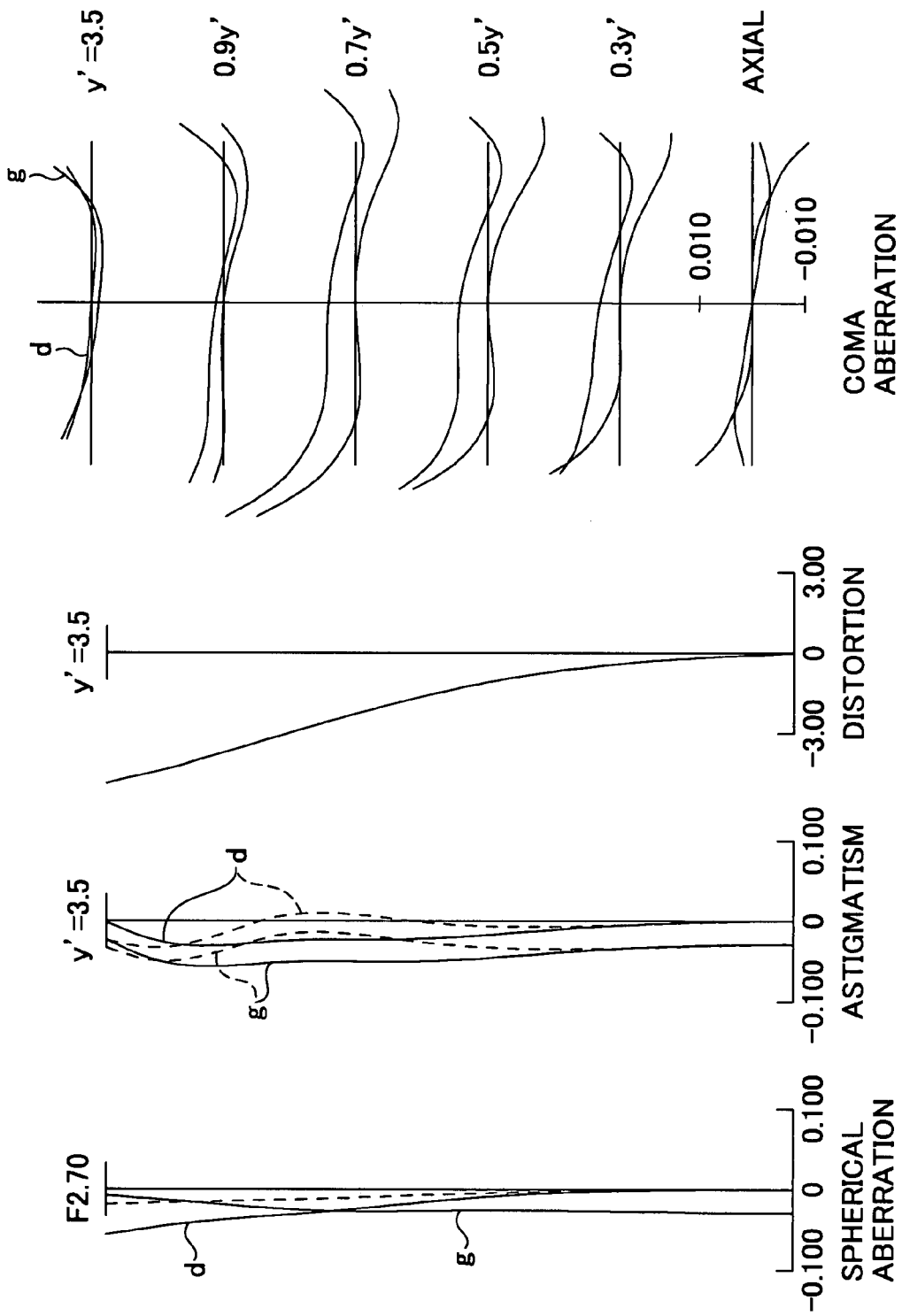
FIG. 8 is a view illustrating aberration diagrams in a short focal length end of the zoom lens according to the second embodiment.
Figure 9:
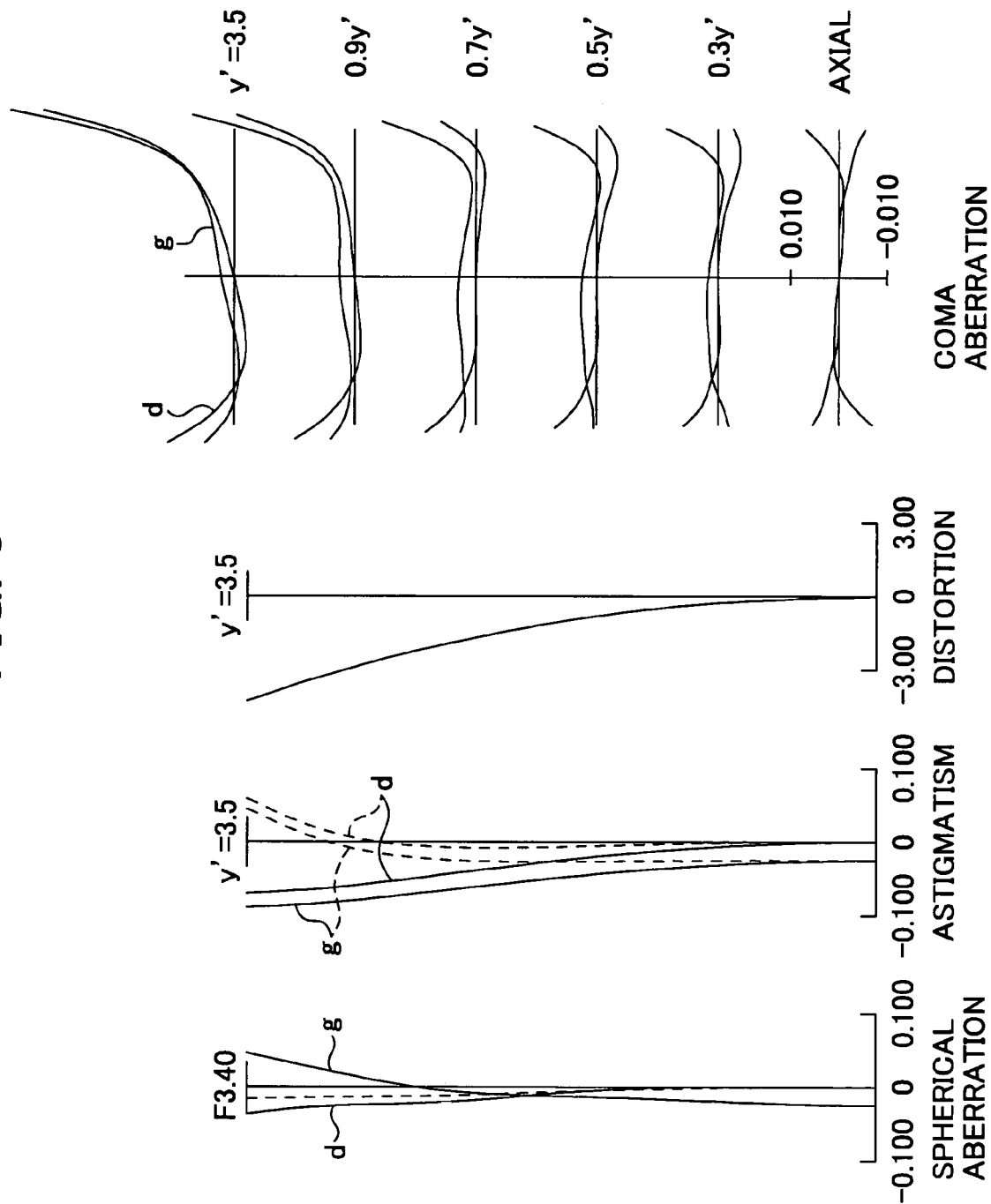
FIG. 9 is a view illustrating aberration diagrams in an intermediate focal length of the zoom lens according to the second embodiment.
Figure 10:
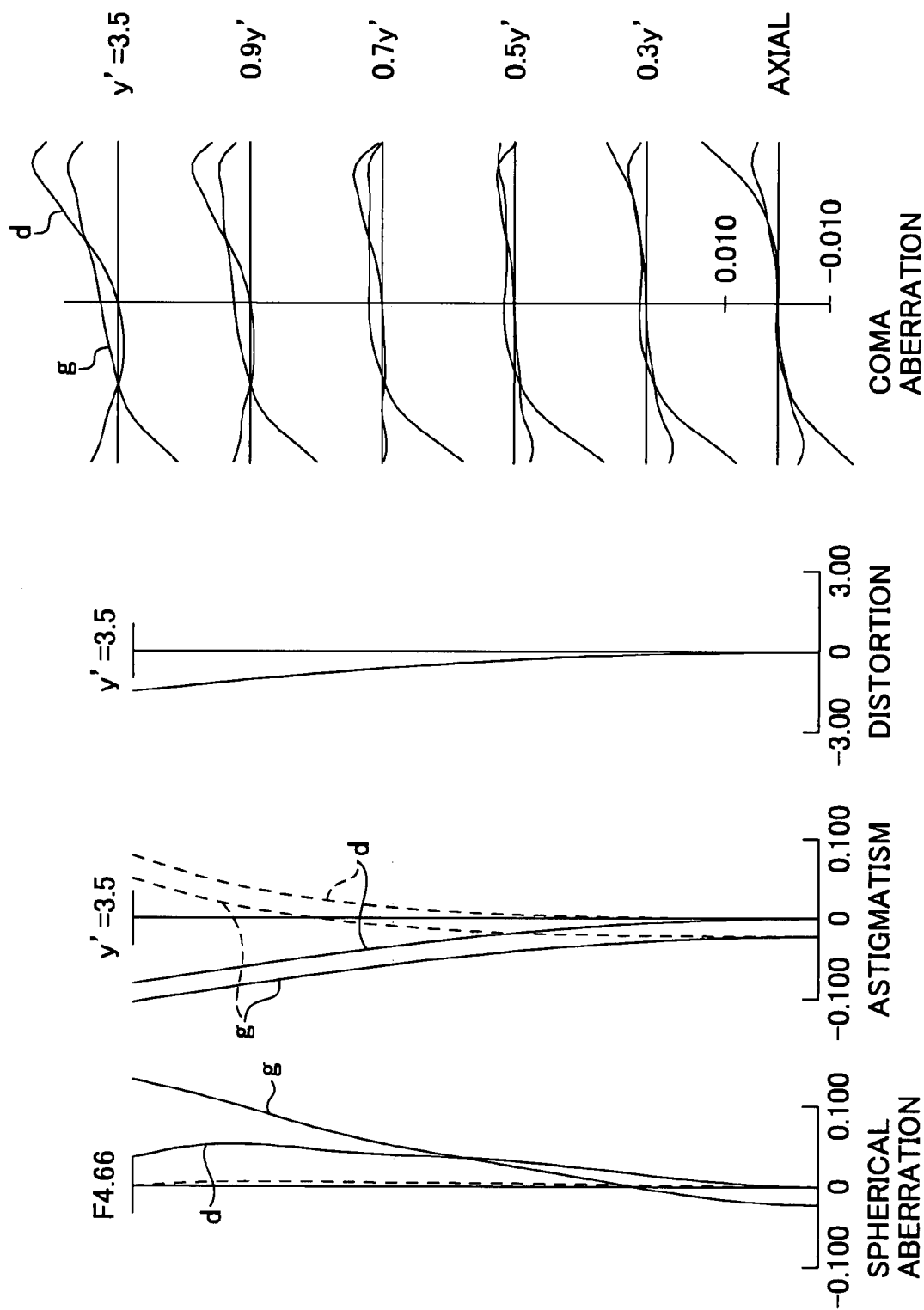
FIG. 10 is a view illustrating aberration diagrams in a long focal length end of the zoom lens according to the second embodiment.

FIGS. 8 to 10 illustrate aberration diagrams of each aberration in the zoom lens illustrated in FIG. 2 according to the second embodiment mentioned above. FIG. 8 illustrates aberration diagrams in the wide angle end, FIG. 9 illustrates aberration diagrams in the intermediate focal length, and FIG. 10 illustrates aberration diagrams in the telephoto end. In each aberration diagram, the dashed lines in the spherical aberration diagram illustrate sine condition, the solid lines in the astigmatic diagram illustrate sagittal, and the dashed lines in the astigmatic diagram illustrate meridional.

According to the aberration diagrams illustrated in FIGS. 8 to 10, it is understood that the aberrations are corrected or suppressed greatly by the zoom lens having a structure illustrated in FIG. 2 according to the second embodiment of the present invention mentioned above.

In the same way, excellent corrections of various aberrations are able to be achieved in the zoom lens which includes three groups having negative-positive-positive focal length, and thus it is possible to provide a compact enough, high performance zoom lens which has a wide field of view of 38 degrees or more in a half-field angle and an F-value of three or less in a short focal length end. In addition, it is possible to provide an imaging device using the zoom lens according to the present embodiment of the present invention.

In particular, by producing the negative lens of the second group optical system with a high refractive index optical material, it is possible to perform the monochromatic aberration correction sufficiently, the image surface correction by the second group optical system becomes possible, and the manufacturing error sensitivity of the negative lens can be controlled.

EMBODIMENT 3

Figure 3:
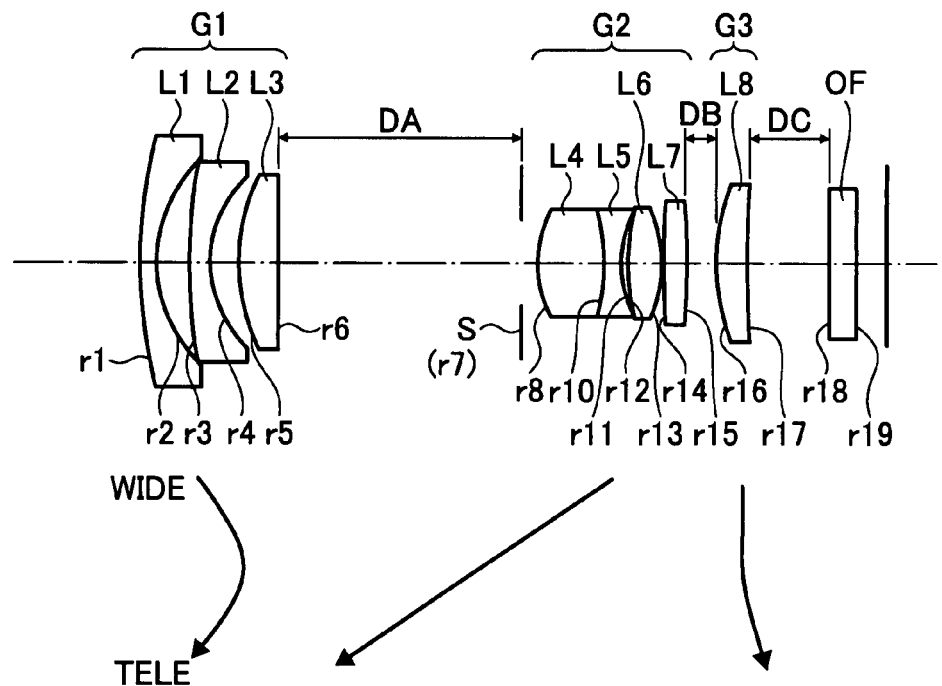
FIG. 3 is a sectional view illustrating a structure of a zoom lens according to a third embodiment of the invention.

FIG. 3 illustrates a structure of optical systems of a zoom lens in a short focal length end, i.e. in a wide angle end, according to the third embodiment of the present invention.

The zoom lens illustrated in FIG. 3 includes a first lens L1, a second lens L2, a third lens L3, an aperture stop S, a fourth lens L4, a fifth lens L5, a sixth lens L6, a seventh lens L7, an eighth lens L8 and an optical filter OF, which are arranged in this order from an object side to an image side, and an image is formed behind the optical filter OF, which has various optical filtering functions, as well as the first and the second embodiments. In the present embodiment, the first lens L1 to the third lens L3 constitute a first group optical system G1, the fourth lens L4 to the seventh lens L7 constitute a second group optical system G2, the eighth lens L8 constitutes a third group optical system G3, and the lenses are supported per group by a common support frame or the like as necessary, and operate integrally per group when zooming and so on is carried out.

In addition, FIG. 3 also illustrates the surface number r1-r19 of each optical surface.

The first lens L1 is a negative meniscus lens formed to be in a convex shape on the object side, the second lens L2 is a negative meniscus lens formed to be in a convex shape on the object side, and the third lens L3 is a plane-convex lens having a convex surface toward the object side. The first group optical system G1 including the first lens L1 to the third lens L3 has a negative focal length, i.e. a negative refractive power as a whole.

The fourth lens L4 is a positive lens having a biconvex lens including a strong convex surface toward the object side, and is also an aspherical lens which has an aspherical surface on a surface on the object side of the lens. The fifth lens L5 is a negative lens having a biconcave lens including a strong concave surface toward the image side. The fourth lens L4 and the fifth lens L5 are in close contact with each other in series and are joined together to form a cemented lens (including two lenses).

The sixth lens L6 is a positive lens which includes a biconvex lens, and the seventh lens L7 is a positive lens having a biconvex lens including a strong convex surface toward the object side. The second group optical system G2, structured by four lenses in three groups, including the fourth lens L4 to the seventh lens L7, has a positive focal length, i.e. a positive refractive power as a whole. The aperture stop S disposed on the object side of the second group optical system G2 operates integrally with the second group optical system G2. The eighth lens L8 is a positive meniscus lens formed to be in a convex shape on the object side, and the third group optical system G3 including only the eighth lens L8 has a positive focal length, i.e. a positive refractive power.

When changing the focal length from a wide angle end (short focal length end) to a telephoto end (long focal length end), the first group optical system G1 moves to the object side with a concave trajectory, and the second group optical system G2 moves to the object side monotonously. Focusing from infinity to a short-range object is performed by moving the third group optical system G3 to the object side on an optical axis. The optical filter OF disposed nearest to the image side structured by a parallel flat plate includes filter types such as a crystal low-pass filter, infrared cut filter and so on.

Variable distances between each group vary with the movement of each group in accordance with the focal length variation. More specially, a distance DA between a surface nearest to the image side in the first group optical system G1 (i.e. a surface r6 which is on the image side of the third lens L3) and a surface (i.e. r7) on the object side of the aperture stop S, which is integrated with the second group optical system G2, a distance DB between a surface nearest to the image side in the second group optical system G2 (i.e. a surface r15 which is on the image side of the seventh lens L7) and a surface nearest to the object side in the third group optical system G3 (i.e. a surface r16 which is on the object side of the eighth lens L8), and a distance DC between a surface nearest to the image side in the third group optical system G3 (i.e. a surface r17 which is on the image side of the eighth lens L8) and a surface on the object side of the optical filter OF (i.e. r18) are varied.

In the third embodiment, in accordance with the focal length variation from the wide angle end to the telephoto end, the focal length of the entire system f, F-number and the half-field angle ω vary as follows:

f: 4.92 to 12.25 mm

F: 2.69 to 4.6

ω: 40°37' to 16°16'

The properties of each optical surface are represented in the following table.

TABLE 7 f = 4.32~12.25, F = 2.69~4.6, ω = 40.37~16.16

| Surface No. | R | D | $N_d$ | $v_d$ | |
|---|---|---|---|---|---|
| 1 | 22.770 | 0.85 | 1.53996 | 59.46 | First Lens |
| 2 | 6.894 | 1.60 | | | |
| 3 | 25.497 | 1.00 | 1.88300 | 40.76 | Second Lens |
| 4* | 4.763 | 1.50 | | | |
| 5 | 9.263 | 1.99 | 1.78472 | 25.68 | Third Lens |
| 6 | ∞ | Variable (DA) | | | |
| 7 | Aperture Stop (S) | 0.8 | | | |
| 8* | 5.202 | 3.31 | 1.80440 | 39.59 | Fourth Lens |
| 10 | −10.372 | 0.85 | 2.00330 | 28.27 | Fifth Lens |
| 11 | 5.097 | 0.39 | | | |
| 12 | 12.075 | 1.63 | 1.48749 | 70.24 | Sixth Lens |
| 13 | −7.630 | 0.10 | | | |
| 14 | 29.044 | 1.20 | 1.48749 | 70.24 | Seventh Lens |
| 15 | −47.842 | Variable (DB) | | | |
| 16 | 10.694 | 1.59 | 1.48749 | 70.24 | Eighth Lens |
| 17 | 52.142 | Variable (DC) | | | |
| 18 | ∞ | 1.34 | 1.50000 | 64.0 | Various Filters |
| 19 | ∞ | | | | |

In Table 7, each optical surface of the fourth surface r4 and the eighth surface r8 shown with an asterisk "*" is an aspheric surface. Parameters in the equation (9) of each aspheric surface are represented in the following table.

TABLE 8

Aspherical coefficient

| | | r4 | r8 |
|---|---|---|---|
| Aspherical coefficient | K | 0.0 | 0.0 |
| | $A_4$ | −1.05198E−03 | −3.99551E−04 |
| | $A_6$ | −4.37814E−05 | 5.44051E−06 |
| | $A_8$ | 3.20887E−06 | −1.03487E−06 |
| | $A_{10}$ | −4.62233E−07 | −4.64646E−07 |
| | $A_{12}$ | 2.14415E−08 | 3.23446E−08 |
| | $A_{14}$ | −3.67062E−10 | 1.17060E−08 |
| | $A_{16}$ | −4.66029E−12 | −5.64834E−10 |
| | $A_{18}$ | −1.04120E−13 | −9.62324E−11 |

The variable distance DA between the first group optical system G1 and the aperture stop S, the variable distance DB between the second group optical system G2 and the third group optical system G3, and the variable distance DC between the third group optical system G3 and the optical filter OF are varied in accordance with zooming, as represented in the following table (Table 9).

TABLE 9

Distance Variation

| | Wide angle end f = 4.32 | Intermediate focal length f = 7.28 | Telephoto end f = 12.26 |
|---|---|---|---|
| DA | 12.329 | 5.122 | 1.200 |
| DB | 1.450 | 6.353 | 15.146 |
| DC | 4.050 | 3.681 | 2.000 |

Values of parameters in the third embodiment which relate to the expressions (1) to (8) mentioned above are as follows:

$Nn=2.00330$ (1)

$vn=28.27$ (2)

$(r1-r2)/(r1+r2)=0.01020$ (3)

$tn/Y=1.19$ (4)

$M/f2=1.077$ (5)

$Nn-Np=0.1989$ (6)

$vn-vp=-11.32$ (7)

$\psi/\{r1*\tan(\omega)\}=0.995$ (8)

Therefore, the values of parameters of the third embodiment for the expressions (1) to (8) mentioned above are within the ranges of the expressions.

Figure 11:
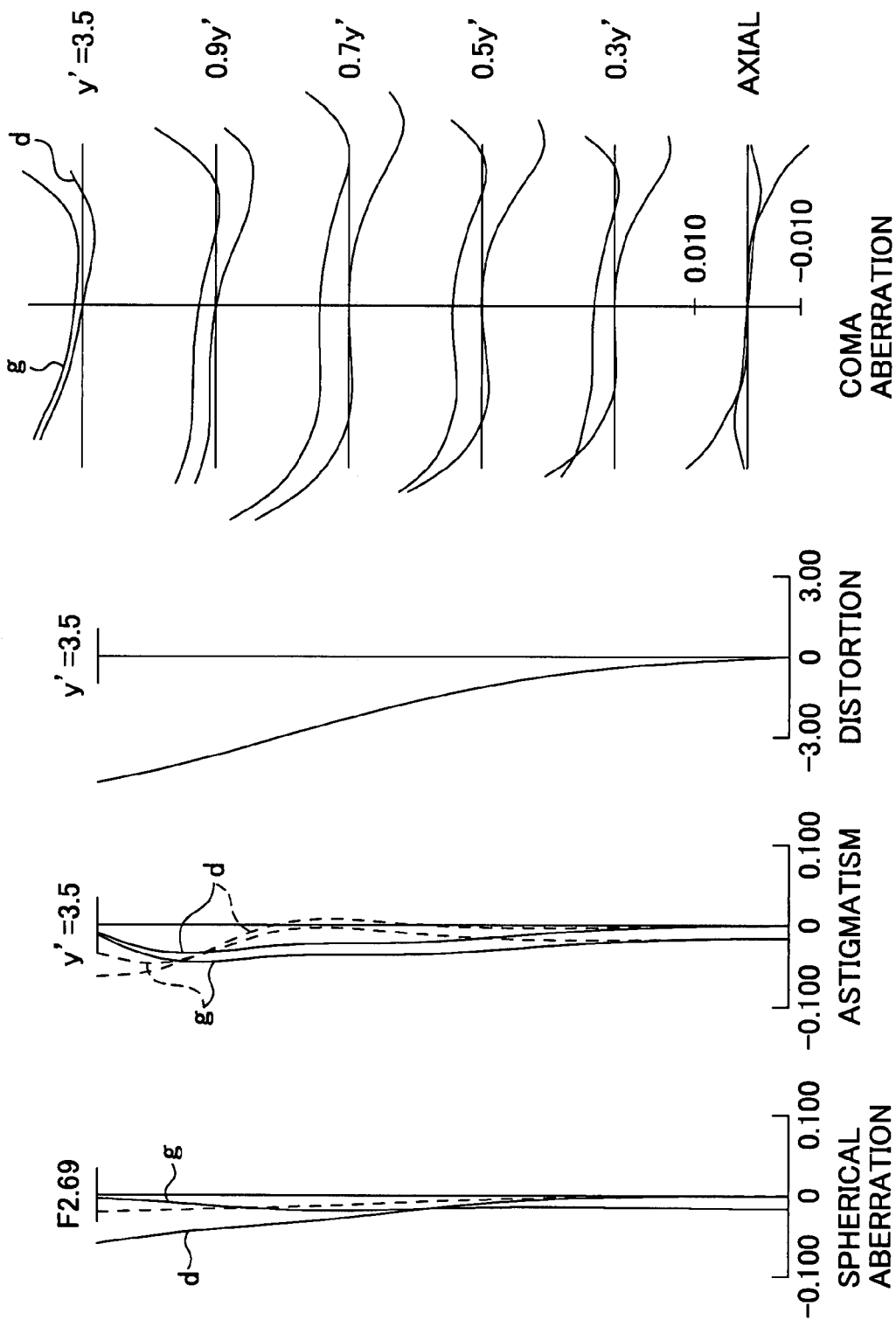
FIG. 11 is a view illustrating aberration diagrams in a short focal length end of the zoom lens according to the third embodiment.
Figure 12:
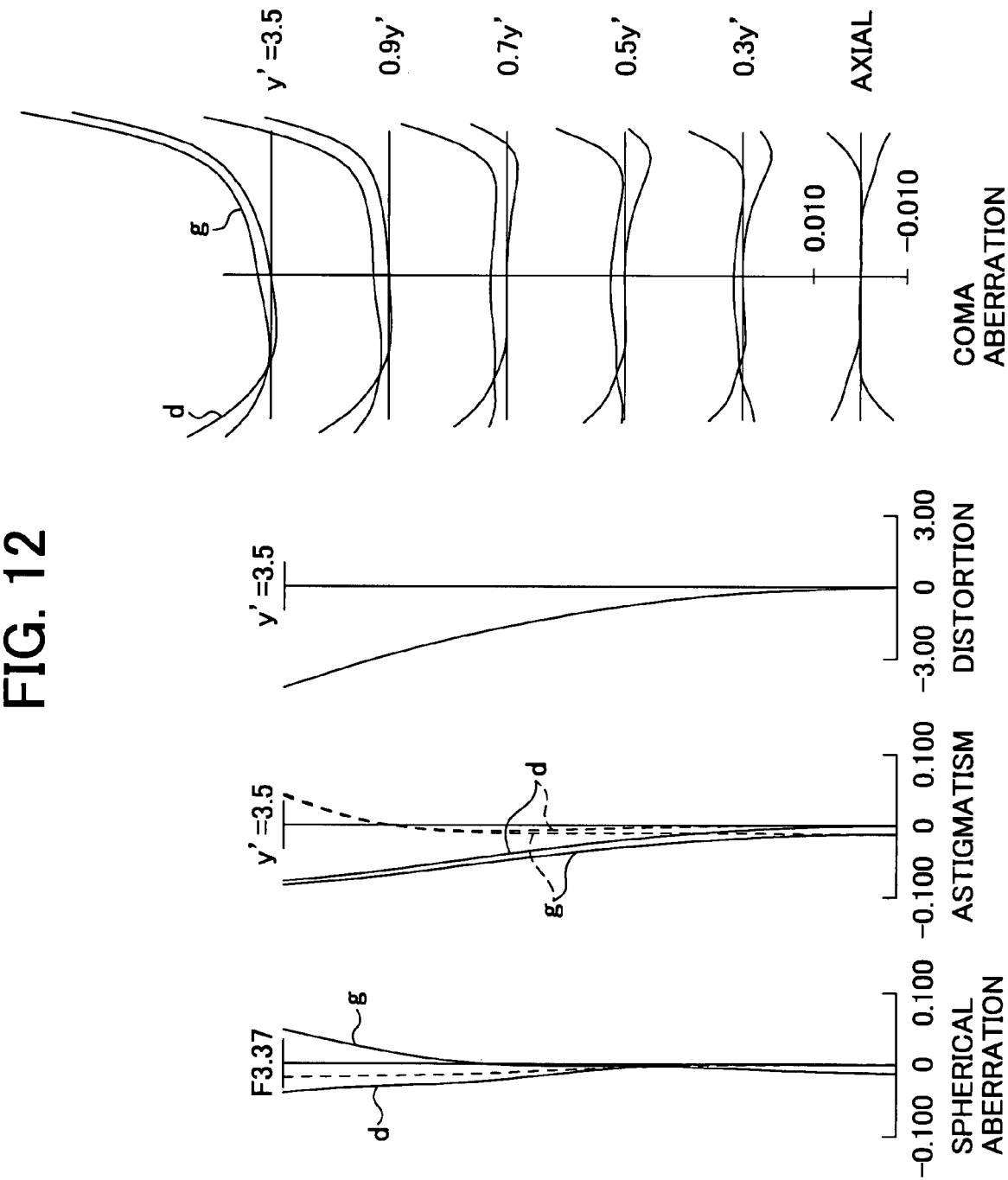
FIG. 12 is a view illustrating aberration diagrams in an intermediate focal length of the zoom lens according to the third embodiment.
Figure 13:
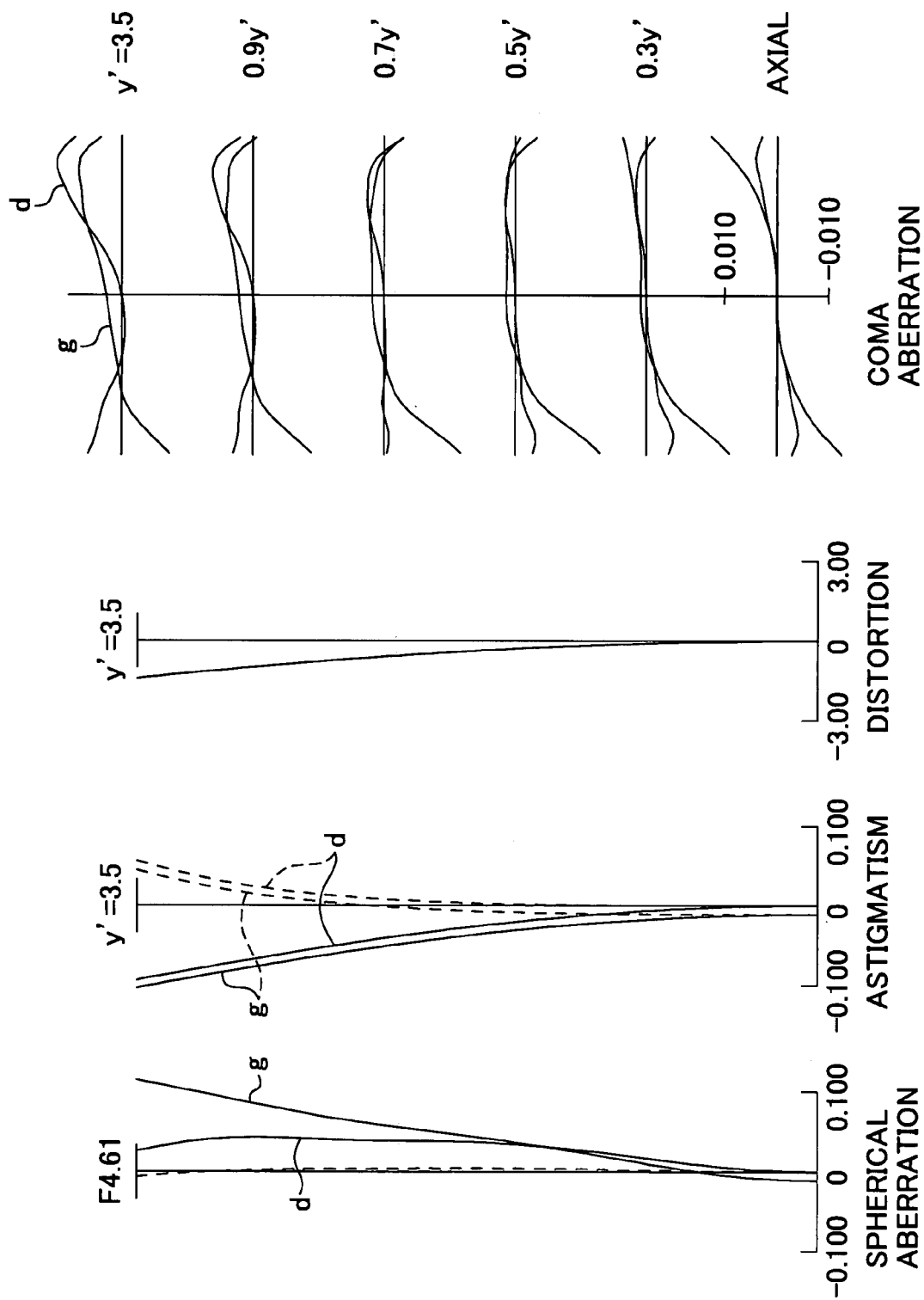
FIG. 13 is a view illustrating aberration diagrams in a long focal length end of the zoom lens according to the third embodiment.

FIGS. 11 to 13 illustrate aberration diagrams of each aberration in the zoom lens illustrated in FIG. 3 according to the third embodiment mentioned above. FIG. 11 illustrates aberration diagrams in the wide angle end, FIG. 12 illustrates aberration diagrams in the intermediate focal length, and FIG. 13 illustrates aberration diagrams in the telephoto end. In each aberration diagrams the dashed lines in the spherical aberration diagram illustrate sine condition, the solid lines in the astigmatic diagram illustrate sagittal, and the dashed lines in the astigmatic diagram illustrate meridional.

According to the aberration diagrams illustrated in FIGS. 11 to 13, it is understood that the aberrations are corrected or suppressed greatly by the zoom lens having a structure illustrated in FIG. 3 according to the third embodiment of the present invention mentioned above.

In the same way, excellent corrections of various aberrations are able to be achieved in the zoom lens which includes three groups having negative-positive-positive focal length, and thus it is possible to provide a compact enough, high performance zoom lens which has a wide field of view of 38 degrees or more in a half-field angle and an F-value of three or less in a short focal length end. In addition, it is possible to provide an imaging device using the zoom lens according to the present embodiment of the present invention.

In particular, by producing the negative lens of the second group optical system with a high refractive index optical material, it is possible to perform the monochromatic aberration correction sufficiently, the image surface correction by the second group optical system becomes possible, and the manufacturing error of the negative lens can be controlled.

EMBODIMENT 4

Figure 4:
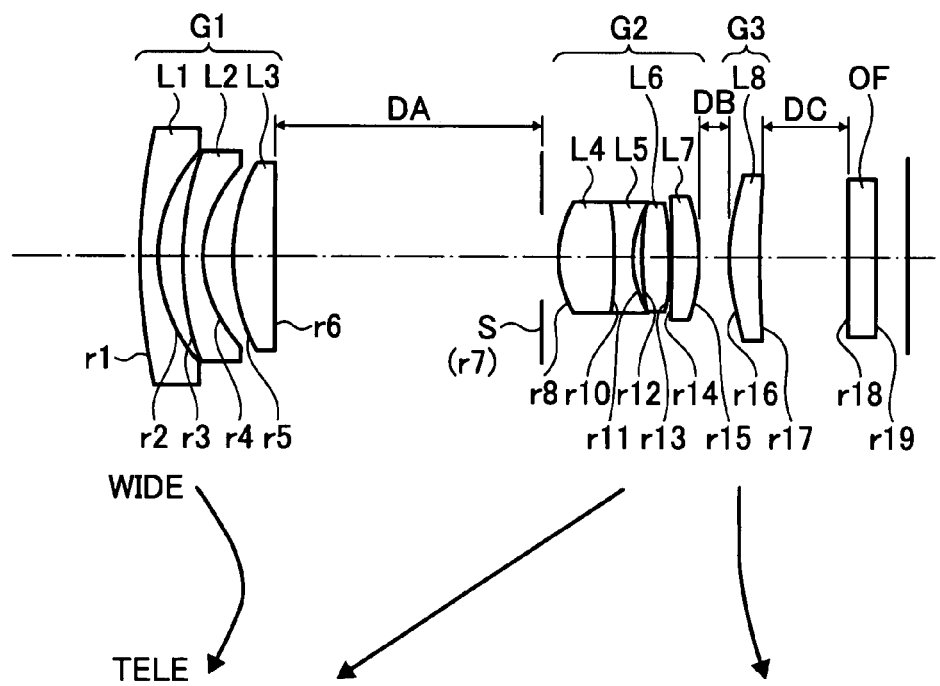
FIG. 4 is a sectional view illustrating a structure of a zoom lens according to a fourth embodiment of the invention.

FIG. 4 illustrates a structure of optical systems of a zoom lens in a short focal length end (i.e. in a wide angle end) according to the fourth embodiment of the present invention.

The zoom lens illustrated in FIG. 4 includes a first lens L1, a second lens L2, a third lens L3, an aperture stop S, a fourth lens L4, a fifth lens L5, a sixth lens L6, a seventh lens L7, an eighth lens L8 and an optical filter OF, which are arranged in this order from an object side to an image side, and an image is formed behind the optical filter OF, which has various optical filtering functions. In the present embodiment, the first lens L1 to the third lens L3 constitute a first group optical system G1, the fourth lens L4 to the seventh lens L7 constitute a second group optical system G2, the eighth lens L8 constitutes a third group optical system G3, and the lenses are supported per group by a common support frame or the like as necessary, and operate integrally per group when zooming and so on is carried out.

In addition, FIG. 4 also illustrates the surface number r1-r19 of each optical surface.

The first lens L1 is a negative meniscus lens formed to be in a convex shape on the object side, the second lens L2 is a negative meniscus lens formed to be in a convex shape on the object side, and the third lens L3 is a plane-convex lens having a convex surface toward the object side. The first group optical system G1 including the first lens L1 to the third lens L3 has a negative focal length, i.e. a negative refractive power as a whole. The fourth lens L4 is a positive lens having a biconvex lens including a strong convex surface toward the object side, and is also an aspherical lens which has an aspherical surface on a surface on the object side of the lens. The fifth lens L5 is a negative lens having a biconcave lens including a strong concave surface toward the image side. The fourth lens L4 and the fifth lens L5 are in close contact with each other in series and are joined together to form a cemented lens (including two lenses). The sixth lens L6 is a positive lens having a biconvex lens, and the seventh lens L7 is a positive lens having a positive meniscus lens including a convex surface toward the image side. The second group optical system G2, structured by four lenses in three groups, including the fourth lens L4 to the seventh lens L7, has a positive focal length, i.e. a positive refractive power as a whole. The aperture stop S disposed on the object side of the second group optical system G2 operates integrally with the second group optical system G2. The eighth lens L8 is a positive meniscus lens formed to be in a convex shape on the object side, and the third group optical system G3 including only the eighth lens L8 has a positive focal length, i.e. a positive refractive power.

When changing the focal length from a wide angle end (short focal length end) to a telephoto end (long focal length end), the first group optical system G1 moves to the object side with a concave trajectory, and the second group optical system G2 moves to the object side monotonously. Focusing from infinity to a short-range object is performed by moving the third group optical system G3 to the object side on an optical axis. The optical filter OF disposed nearest to the image side structured by a parallel flat plate includes filter types such as a crystal low-pass filter, infrared cut filter and so on.

Variable distances between each group vary with the movement of each group in accordance with the focal length variation. More specially, a distance DA between a surface nearest to the image side in the first group optical system G1 (i.e. a surface r6 which is on the image side of the third lens L3) and a surface (i.e. r7) on the object side of the aperture stop S, which is integrated with the second group optical system G2, a distance DB between a surface nearest to the image side in the second group optical system G2 (i.e. a surface r15 which is on the image side of the seventh lens L7) and a surface nearest to the object side in the third group optical system G3 (i.e. a surface r16 which is on the object side of the eighth lens L8), and a distance DC between a surface nearest to the image side in the third group optical system G3 (i.e. a surface r17 which is on the image side of the eighth lens L8) and a surface on the object side of the optical filter OF (i.e. r18) are varied.

In the fourth embodiment, in accordance with the focal length variation from the wide angle end to the telephoto end, the focal length of the entire system f, F-number and the half-field angle ω vary as follows:

f: 4.31 to 12.26 mm

F: 2.67 to 4.56

ω: 40°42' to 16°15'

The properties of each optical surface are represented in the following table (Table 10).

TABLE 10

$f = 4.31\sim12.26, F = 2.67\sim4.56, \omega = 40.42\sim16.15$

| Surface No. | R | D | $N_d$ | $\nu_d$ | |
|---|---|---|---|---|---|
| 1 | 30.185 | 0.85 | 1.77250 | 49.60 | First Lens |
| 2 | 7.274 | 1.18 | | | |
| 3 | 14.906 | 1.00 | 1.88300 | 40.76 | Second Lens |
| 4* | 5.042 | 1.50 | | | |
| 5 | 9.610 | 2.07 | 1.78472 | 25.68 | Third Lens |
| 6 | ∞ | Variable (DA) | | | |
| 7 | Aperture Stop (S) | 0.8 | | | |
| 8* | 5.214 | 2.68 | 1.90366 | 31.32 | Fourth Lens |
| 10 | −16.733 | 0.85 | 2.00000 | 22.50 | Fifth Lens |
| 11 | 4.700 | 0.48 | | | |
| 12 | 19.653 | 1.32 | 1.48749 | 70.24 | Sixth Lens |
| 13 | −14.426 | 0.10 | | | |
| 14 | −119.739 | 1.38 | 1.48749 | 70.24 | Seventh Lens |
| 15 | −9.021 | Variable (DB) | | | |
| 16 | 11.369 | 1.58 | 1.48749 | 70.24 | Eighth Lens |
| 17 | 83.872 | Variable (DC) | | | |
| 18 | ∞ | 1.34 | 1.50000 | 64.0 | Various Filters |
| 19 | ∞ | | | | |

In Table 10, each optical surface of the fourth surface r4 and the eighth surface r8 shown with an asterisk "*" is an aspheric surface. Parameters in the equation (9) of each aspheric surface are represented in the following Table 11.

TABLE 11

| | Aspherical coefficient | | |
|---|---|---|---|
| | | r4 | r8 |
| Aspherical coefficient | K | 0.0 | 0.0 |
| | $A_4$ | −9.43667E−04 | −4.27579E−04 |
| | $A_6$ | −4.02348E−05 | 7.89267E−06 |
| | $A_8$ | 3.80471E−06 | −1.14476E−06 |
| | $A_{10}$ | −4.84248E−07 | −4.98385E−07 |
| | $A_{12}$ | 2.33663E−08 | 7.59447E−09 |
| | $A_{14}$ | −3.35177E−10 | 1.44427E−08 |
| | $A_{16}$ | −1.32712E−11 | 2.88126E−10 |
| | $A_{18}$ | 3.06619E−13 | −2.03093E−10 |

The variable distance DA between the first group optical system G1 and the aperture stop S, the variable distance DB between the second group optical system G2 and the third group optical system G3, and the variable distance DC between the third group optical system G3 and the optical filter OF are varied in accordance with zooming, as represented in the following table (Table 12).

TABLE 12

| | Distance Variation | | |
|---|---|---|---|
| | Wide angle end f = 4.31 | Intermediate focal length f = 7.28 | Telephoto end f = 12.26 |
| DA | 13.109 | 5.537 | 1.200 |
| DB | 1.471 | 6.736 | 15.163 |
| DC | 4.291 | 3.592 | 2.000 |

Values of parameters in the fourth embodiment which relate to the expressions (1) to (8) mentioned above are as follows:

$$Nn=2.00000 \quad (1)$$

$$vn=22.50 \quad (2)$$

$$(r1-r2)/(r1+r2)=0.05185 \quad (3)$$

$$tn/Y=1.01 \quad (4)$$

$$M/f2=1.028 \quad (5)$$

$$Nn-Np=0.09634 \quad (6)$$

$$vn-vp=-8.82 \quad (7)$$

$$\psi/\{r1*\tan(\omega)\}=0.991 \quad (8)$$

Therefore, the values of parameters of the fourth embodiment for the expressions (1) to (8) mentioned above are within the ranges of the expressions.

Figure 14:
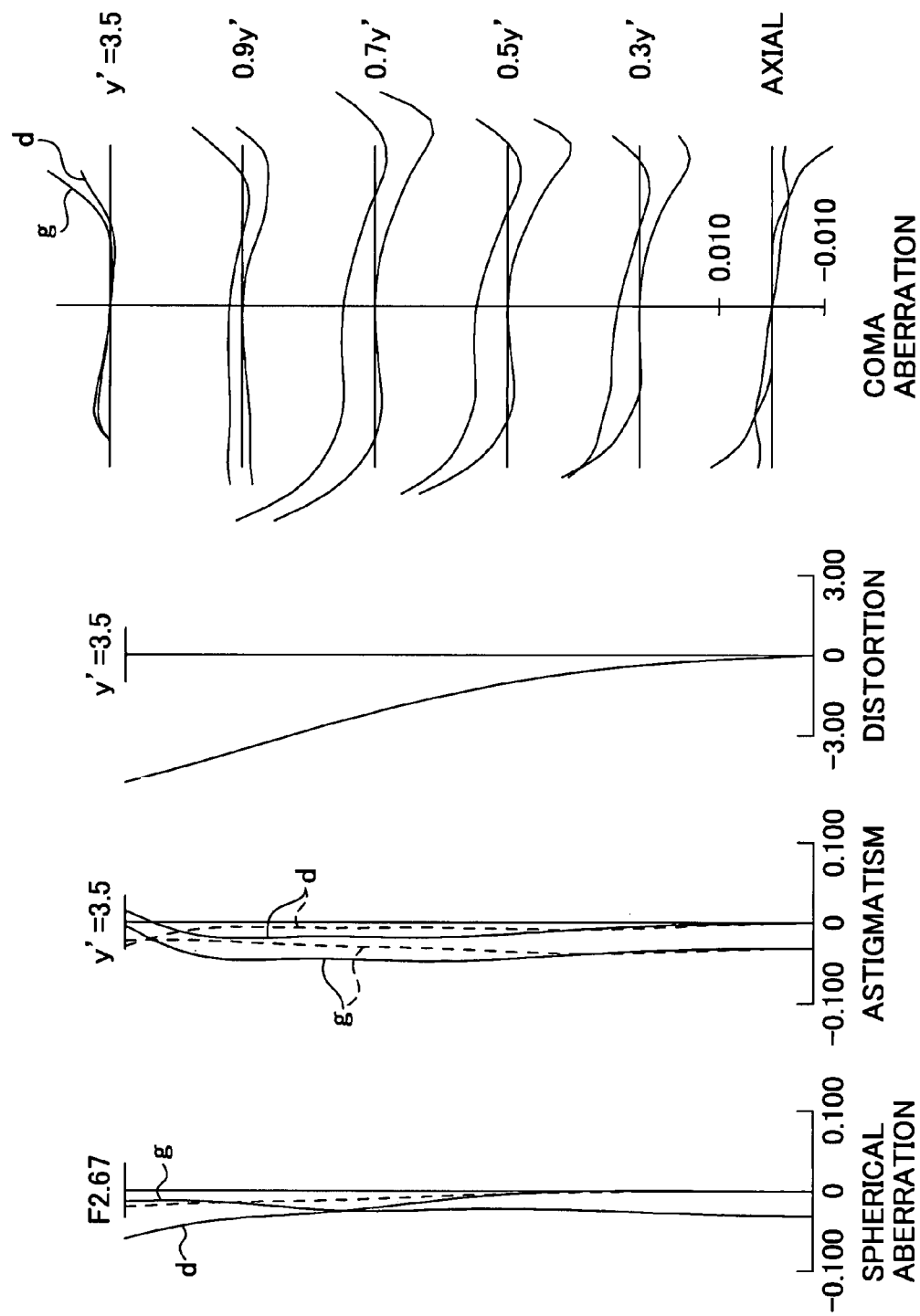
FIG. 14 is a view illustrating aberration diagrams in a short focal length end of the zoom lens according to the fourth embodiment.
Figure 15:
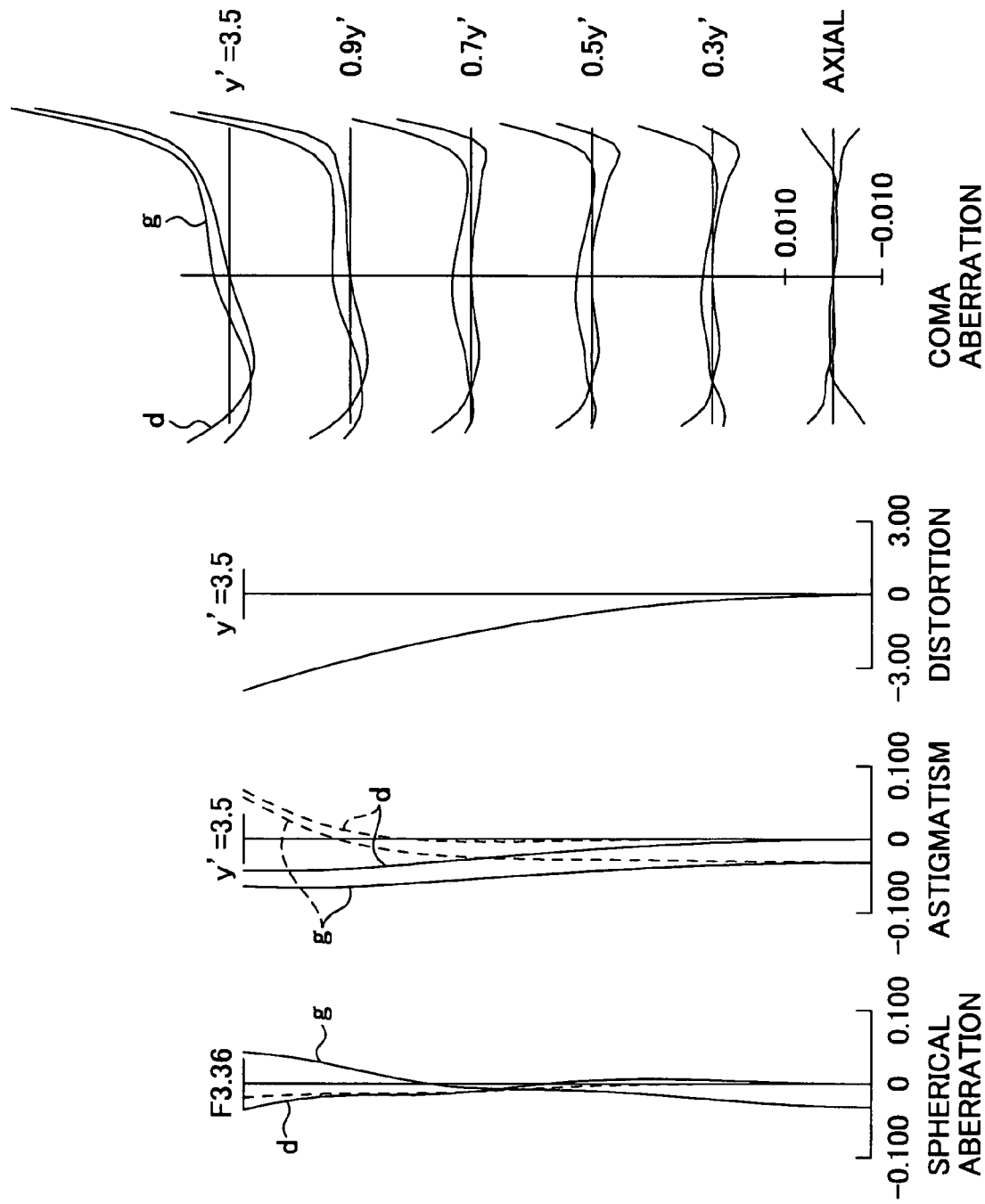
FIG. 15 is a view illustrating aberration diagrams in an intermediate focal length of the zoom lens according to the fourth embodiment.
Figure 16:
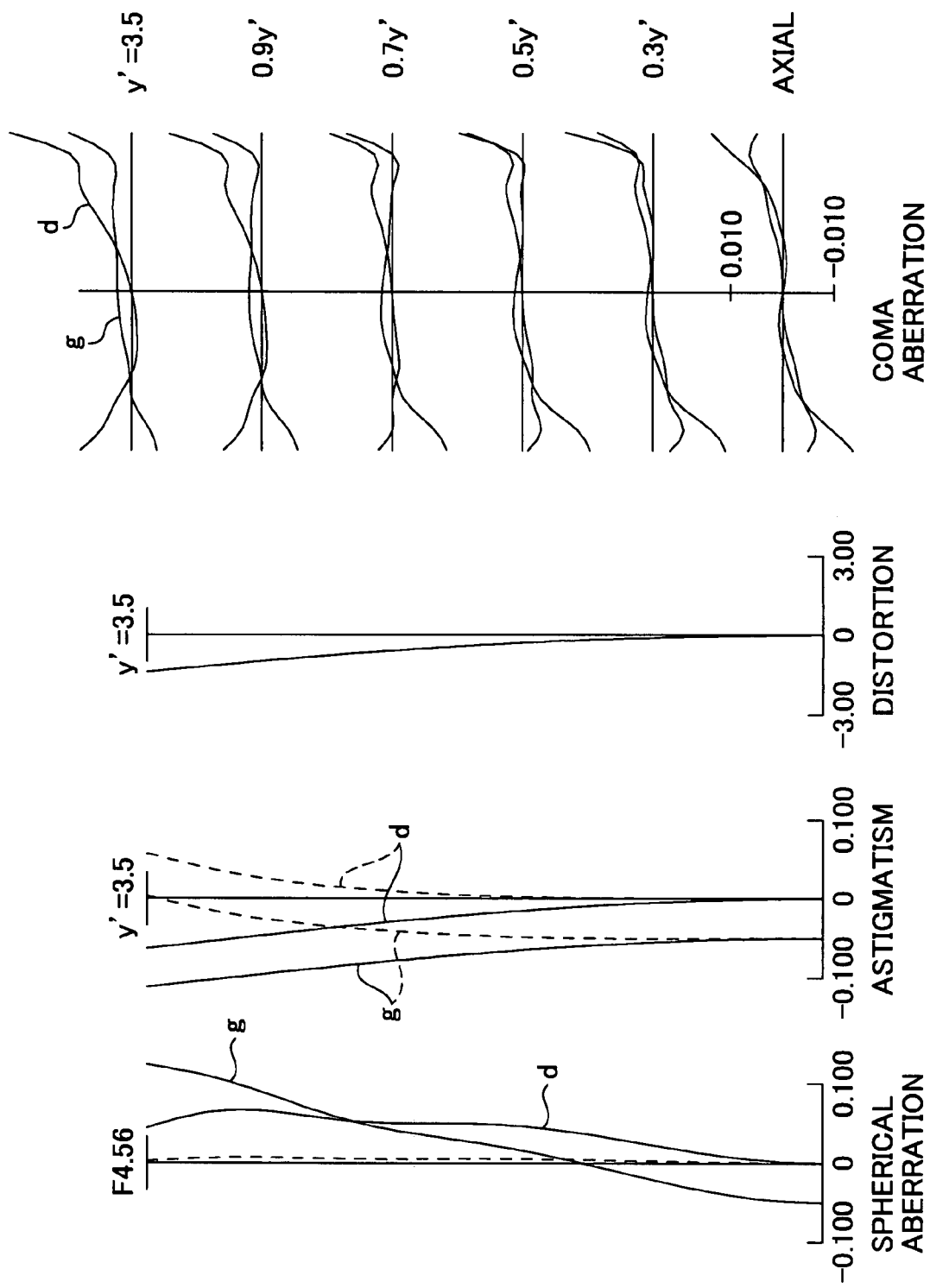
FIG. 16 is a view illustrating aberration diagrams in a long focal length end of the zoom lens according to the fourth embodiment. The dashed line in the spherical aberration diagram illustrates a sine condition, the solid line in the astigmatic diagram illustrates sagittal, and the dashed line in the astigmatic diagram illustrates meridional.

FIGS. 14 to 16 illustrate aberration diagrams of each aberration in the zoom lens illustrated in FIG. 4 according to the fourth embodiment above-mentioned. FIG. 14 illustrates aberration diagrams in the wide angle end, FIG. 15 illustrates aberration diagrams in the intermediate focal length, and FIG. 16 illustrates aberration diagrams in the telephoto end.

According to the aberration diagrams illustrated in FIGS. 14 to 16, it is understood that the aberrations are corrected or suppressed greatly by the zoom lens having a structure illustrated in FIG. 4 according to the fourth embodiment of the present invention mentioned above.

In the same way, excellent corrections of various aberrations are able to be achieved in the zoom lens which includes three groups having negative-positive-positive focal length, and thus it is possible to provide a compact enough, high performance zoom lens which has a wide field of view of 38 degrees or more in a half-field angle and an F-value of three or less in a short focal length end. In addition, it is possible to provide an imaging device using the zoom lens according to the present embodiment of the present invention.

In particular, by producing the negative lens of the second group optical system with a high refractive index optical material, it is possible to perform the monochromatic aberration correction sufficiently, the image surface correction, by the second group optical system becomes possible, and the manufacturing error of the negative lens can be controlled.

Figure 17A:
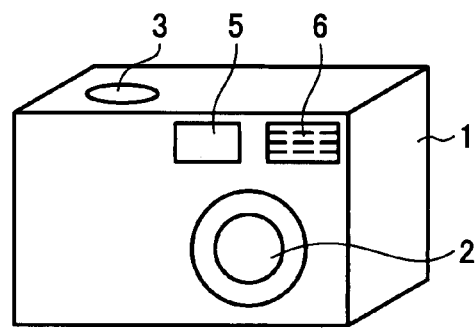
Figure 17B:
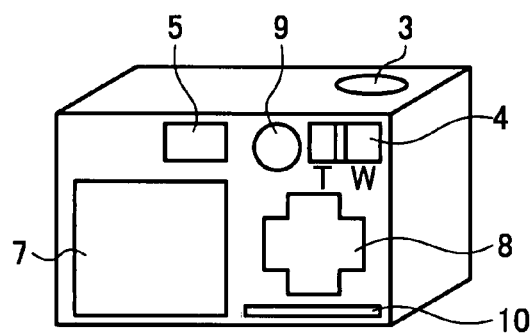
Figure 18:
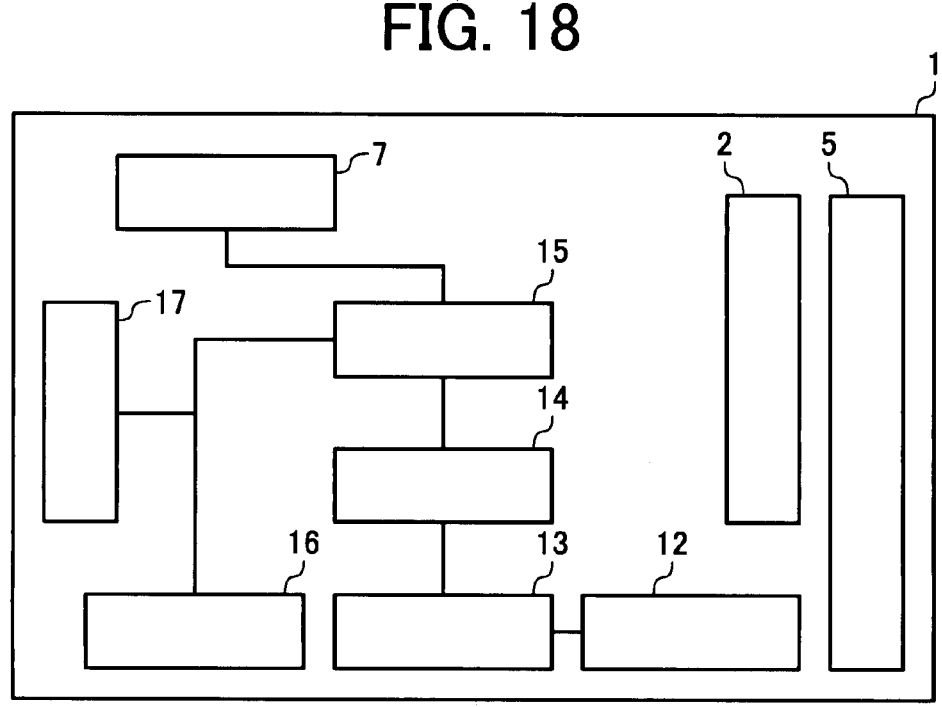
FIG. 18 is a block diagram illustrating an outline of a system structure of the camera device according to an embodiment of the present invention.

Next, an embodiment of a camera device of the present invention will be explained with reference to FIGS. 17A, 17B and 18. The camera device adopts a photographing optical system as a zoom lens according to the present invention described in, the first to the fourth embodiments mentioned above. FIG. 17A is an external perspective view schematically illustrating a camera device viewed from the front side, which is the object, i.e. the subject side. FIG. 17B is an external perspective view schematically illustrating the camera device viewed from the back side, which is the photographer side. FIG. 18 is a block diagram illustrating the functional configuration of the camera device according to an embodiment of the present invention.

Above the camera device is explained, however recently a mobile information terminal into which the camera function is built such as a so-called PDA (personal data assistant) or a cellular phone has become popular. Such a mobile information terminal has substantially similar functions and structures as the camera device though they have different appearances, and it is possible to adopt the optical system or the camera device according to the invention for such a mobile information terminal.

As illustrated in FIGS. 17A and 17B, a camera 1 includes a photographing lens 2, a shutter button 3, a zoom lever 4, a finder 5, a strobe light 6, a crystal monitor 7, an operation button 8, a power switch 9, and a memory/communication card slot 10 or the like. Further, as illustrated in FIG. 18, the camera 1 also includes a light-receiving element 12, a signal processing device 13. an image processing device 14, a central processing unit (CPU) 15, a semiconductor memory 16 and a communication card 17 or the like.

The camera 1 includes the photographing lens 2 which is used as a photographing optical system, and the light-receiving element 12 which is used as an area-type sensor such as a CCD (charge-coupled device) image sensor or the like. In the camera 1, an image of a subject taken by the photographing lens 2 is read out by the light-receiving element 12. The photographing optical systems described in the first to the fourth embodiments of the present invention are used as the photographing lens 2. In particularly, lenses or the like which are optical components forming a photographing optical system as a zoom lens are used to form a lens unit. This lens unit includes a holding mechanism which holds each lens or the like so that at least each lens or the like is capable of being moved and operated per lens group. The photographing lens 2 incorporated in the camera is usually incorporated in the form of this lens unit.

Output from the light-receiving element 12 is processed by the signal processing device 13, which is controlled by the central processing unit 15, to be converted into digital image data. The image data digitized by the signal processing device 13 is recorded in the semiconductor memory 16 such as a nonvolatile memory, after being subjected to a predetermined image processing in the image processing device 14, which is controlled by the central processing unit 15 as well. In the present embodiment, it is possible for the semiconductor memory 16 to be a memory card that is inserted in the memory/communication card slot 10 or the like, or a semiconductor memory that is embedded in the main body of the camera. The liquid crystal monitor 7 may display an image during photographing as well as an image recorded in the semiconductor memory 16. Moreover, the image recorded in the semiconductor memory 16 may be exported through the communication card 17 or the like inserted in the memory/communication card slot 10.

As illustrated in FIG. 17A, when the camera device 1 is being carried, the photographing lens 2 is in a collapsed state to be stored inside the body of the camera device 1. If a user operates the power source switch 9 to turn on the power, the lens barrel is extended and the photographing lens 2 is projected from the body of the camera device 1. At this time, in the interior of the lens barrel of the photographing lens 2, each group of the optical systems constituting the zoom lens is in, for example, an arrangement of a wide angle end, and it is possible to change the arrangement of each group of optical systems to perform a magnification change to the long focal length end by operating the zoom lever 4. In addition, it is preferable that a magnification of an optical system of the finder 5 be changed in conjunction with the variation of a field of view of the photographing lens 2.

In many cases, focusing is performed by half-pressing the shutter button 3, and the photographing is performed by further pressing the shutter button 3 to the full-pressing state. And then the processes mentioned above are performed.

When displaying the image recorded in the semiconductor memory 16 on the liquid crystal monitor 7, and when exporting the image through the communication card 17 or the like, the operation button 8 is used. The semiconductor memory 16 and the communication card 17 or the like, may be inserted respectively into exclusive-use or general-purpose slots such as the memory/communication card slot 10, to use.

In addition, when the photographing lens 2 is in the collapsed state, it is not always necessary for each group of the zoom lens to be lined on the optical axis. For example, if the zoom lens has a structure such that a plurality of groups of optical systems are collapsed in parallel, a camera device with a further compact body may be obtained.

As mentioned above, the photographing lens 2 having the zoom lens explained in the first to the fourth embodiments can be used as an optical system for photographing in the above-mentioned camera device or the mobile information terminal. Accordingly, a compact, high image quality camera device or a mobile information terminal, using a light-receiving element having three million pixels or more may be achieved.

Accordingly, the zoom lens and the camera device according to embodiments of the present invention at least have the following advantageous:

1. It is possible to provide a zoom lens which is compact enough and high performance, and has a wide field of view of 38 degrees or more in a half-field angle and an F-value of three or less in a short focal length end.

2. It is also possible to provide a zoom lens capable of performing monochromatic aberration correction sufficiently, and controlling the manufacturing error of a negative lens.

3. It is possible to provide a high performance zoom lens with higher imaging performance.

4. It is possible to provide a compact, higher performance zoom lens while a length of collapse is shortened.

5. It is possible to provide a compact enough and even higher performance zoom lens with little influence of connecting error and having a more stabilized performance.

6. It is possible to provide a zoom lens with even higher imaging performance while the total length of lenses is shortened.

7. It is possible to provide a zoom lens which can correct axial chromatic aberration generated by a positive lens disposed nearest to an object side in a second group optical system and correct chromatic aberration of magnification generated by a lens with a highest refractive index in at least one negative lens of a second group optical system.

8. It is possible to provide a zoom lens having a wide field of view and low F-number and high imaging performance.

9. It is possible to provide an imaging device using one of the zoom lenses according to the present invention.

10. By applying one of the zoom lenses or the imaging device using one of the zoom lenses mentioned above to a camera device, it is possible to provide a compact enough, high performance camera device which has excellent portability and is capable of obtaining high image quality, and has a wide field of view of 38 degrees or more in a half-field angle and an F-value of three or less in a short focal length end.

11. By applying one of the zoom lenses or the imaging device using one of the zoom lenses mentioned above to a mobile information terminal, it is possible to provide a compact enough, high performance mobile information terminal which photographs an image with high image quality and has excellent portability for a user, and has a wide field of view of 38 degrees or more in a half-field angle and an F-number of three or less in a short focal length end.

It should be noted that although the present invention has been described with respect to exemplary embodiments, the invention is not limited thereto. In view of the foregoing, it is intended that the present invention cover modifications and variations provided they fall within the scope of the following claims and their equivalent.

The entire contents of Japanese patent application No. JP 2006-076892, filed on Mar. 20, 2006, of which the convention priority is claimed in this application, are incorporated hereinto by reference.

What is claimed is:

1. A zoom lens, comprising:
a first group optical system having a negative focal length;
a second group optical system having a positive focal length and including at least two positive lenses and at least one negative lens in which one of the two positive lenses is disposed nearest to an object side in the second group optical system;
a third group optical system having a positive focal length,
the first group optical system, the second group optical system and the third group optical system being arranged in this order from the object side to an image side; and
an aperture stop configured to move together with the second group optical system and disposed on the object side of the second group optical system,
a change in magnification being carried out by decreasing a space between the first group optical system and the second group optical system when the change in magnification is carried out from a short focal length end to a long focal length end, wherein
the following formulae are satisfied:

$$1.95 < Nn < 2.20$$

$$15 < vn < 35$$

in which $Nn$ represents a refractive index of a lens with a highest refractive index in the at least one negative lens of the second group optical system, and $vn$ represents an Abbe number of the lens with the highest refractive index in the at least one negative lens of the second group optical system.

2. A zoom lens according to claim 1, further satisfying the following formula:

$$-0.02 < (r1 - r2)/(r1 + r2) < 0.07$$

in which $r1$ represents a curvature radius of a surface on the object side of the positive lens disposed nearest to the object side in the second group optical system, and $r2$ represents a curvature radius of a surface on the image side of the lens with the highest refractive index in the at least one negative lens of the second group optical system.

3. A zoom lens according to claim 1, further satisfying the following formula:

$$0.8 < tn/Y' < 1.4$$

in which $tn$ represents a distance on an optical axis from the surface on the object side of the positive lens disposed nearest to the object side in the second group optical system to the surface on the image side of the lens with the highest refractive index in the at least one negative lens of the second group optical system, and Y' represents a largest image height.

4. A zoom lens according to claim 1, wherein the second group optical system includes a cemented lens of a positive lens and a negative lens.

5. A zoom lens according to claim 1, wherein at least one of the positive lenses of the second group optical system is an aspherical surface.

6. A zoom lens according to claim 5, wherein the surface on the object side of the positive lens disposed nearest to the object side in the second group optical system includes an aspherical surface.

7. A zoom lens according to claim 1, further satisfying the following formula:

$$0.8 < M/f2 < 1.5$$

in which M represents a displacement of the second group optical system, and f2 represents a focal length of the second group optical system.

8. A zoom lens according to claim 1, further satisfying the following formula:

$$0.05 < Nn - Np < 0.3$$

in which Nn represents the refractive index of the lens with the highest refractive index in the at least one negative lens of the second group optical system, and Np represents a refractive index of the positive lens disposed nearest to the object side in the second group optical system.

9. A zoom lens according to claim 1, further satisfying the following formula:

$$-15 < vn - vp < -5$$

in which vn represents the Abbe number of the lens with the highest refractive index in the at least one negative lens of the second group optical system, and vp represents an Abbe number of the positive lens disposed nearest to the object side in the second group optical system.

10. A zoom lens according to claim 1, further satisfying the following formula:

$$0.8 < \psi / \{r1 * \tan(\omega)\} < 1.2$$

in which $\psi$ represents a largest diameter of the aperture stop, $\omega$ represents a half-field angle in the short focal length end, and r1 represents the curvature radius of the surface on the object side of the positive lens disposed nearest to the object side in the second group optical system.

11. A zoom lens according to claim 1, wherein the third group optical system comprises a spherical lens.

12. An imaging device, including a zoom lens comprising:

a first group optical system having a negative focal length;

a second group optical system having a positive focal length and including at least two positive lenses and at least one negative lens in which one of the two positive lenses is disposed nearest to an object side in the second group optical system;

a third group optical system having a positive focal length, the first group optical system, the second group optical system and the third group optical system being arranged in this order from the object side to an image side; and an aperture stop configured to move together with the second group optical system and disposed on the object side of the second group optical system, a change in magnification being carried out by decreasing a space between the first group optical system and the second group optical system when the change in magnification is carried out from a short focal length end to a long focal length end, wherein the following formulae are satisfied:

$$1.95 < Nn < 2.20$$

$$15 < vn < 35$$

in which Nn represents a refractive index of a lens with a highest refractive index in the at least one negative lens of the second group optical system, and vn represents an Abbe number of the lens with the highest refractive index in the at least one negative lens of the second group optical system.

13. A camera device, including a zoom lens comprising:

a first group optical system having a negative focal length;

a second group optical system having a positive focal length and including at least two positive lenses and at least one negative lens in which one of the two positive lenses is disposed nearest to an object side in the second group optical system;

a third group optical system having a positive focal length, the first group optical system, the second group optical system and the third group optical system being arranged in this order from the object side to an image side; and an aperture stop configured to move together with the second group optical system and disposed on the object side of the second group optical system, a change in magnification being carried out by decreasing a space between the first group optical system and the second group optical system when the change in magnification is carried out from a short focal length end to a long focal length end, wherein the following formulae are satisfied:

$$1.95 < Nn < 2.20$$

$$15 < vn < 35$$

in which Nn represents a refractive index of a lens with a highest refractive index in the at least one negative lens of the second group optical system, and vn represents an Abbe number of the lens with the highest refractive index in the at least one negative lens of the second group optical system.

14. A camera device according to claim 13, wherein the camera device has a function of converting a photographed image into digital data.

15. A camera device according to claim 14, further comprising a light-receiving element configured to receive an image captured by the zoom lens, and having pixels equal to or more than three million.

16. A mobile information terminal, including a zoom lens comprising:

a first group optical system having a negative focal length;

a second group optical system having a positive focal length and including at least two positive lenses and at least one negative lens in which one of the two positive lenses is disposed nearest to an object side in the second group optical system;

a third group optical system having a positive focal length,
the first group optical system, the second group optical system and the third group optical system being arranged in this order from the object side to an image side; and
an aperture stop configured to move together with the second group optical system and disposed on the object side of the second group optical system,
a change in magnification being carried out by decreasing a space between the first group optical system and the second group optical system when the change in magnification is carried out from a short focal length end to a long focal length end, wherein the following formulae are satisfied:

$$1.95 < Nn < 2.20$$

$$15 < vn < 35$$

in which Nn represents a refractive index of a lens with a highest refractive index in the at least one negative lens of the second group optical system, and vn represents an Abbe number of the lens with the highest refractive index in the at least one negative lens of the second group optical system.

* * * * *